(12) United States Patent
Siefken et al.

(10) Patent No.: US 12,307,505 B2
(45) Date of Patent: May 20, 2025

(54) SYSTEM FOR EATERY ORDERING WITH MOBILE INTERFACE AND POINT-OF-SALE TERMINAL

(71) Applicant: XENIAL, INC., Charlotte, NC (US)

(72) Inventors: Christopher Siefken, Charlotte, NC (US); Mahesh Kommareddi, Charlotte, NC (US); William Wine, Charlotte, NC (US); Arjun Wadwalkar, Charlotte, NC (US); Santiago Lopez, Medellin (CO); David Sanchez, Medellin (CO); Davison Anaya, Medellin (CO)

(73) Assignee: Xenial, Inc., Charlotte, NC (US)

( * ) Notice: Subject to any disclaimer, the term of this patent is extended or adjusted under 35 U.S.C. 154(b) by 0 days.

(21) Appl. No.: 18/226,367

(22) Filed: Jul. 26, 2023

(65) Prior Publication Data
US 2023/0368274 A1 Nov. 16, 2023

Related U.S. Application Data

(62) Division of application No. 16/800,428, filed on Feb. 25, 2020, now Pat. No. 11,741,529.
(Continued)

(51) Int. Cl.
*G06Q 30/06* (2023.01)
*G06F 40/295* (2020.01)
(Continued)

(52) U.S. Cl.
CPC ....... *G06Q 30/0635* (2013.01); *G06F 40/295* (2020.01); *G06N 20/00* (2019.01);
(Continued)

(58) Field of Classification Search
CPC .... G06Q 30/0641; G06Q 20/00; G06Q 50/12; G06F 40/295; G10L 15/30
(Continued)

(56) References Cited

U.S. PATENT DOCUMENTS 7,082,314 B2  7/2006  Farmer et al.
7,945,479 B2  5/2011  Asher et al.
(Continued)

FOREIGN PATENT DOCUMENTS

CN  107430858 A * 12/2017 ............. G10L 17/00
EP  3 040 985 A1  7/2016
(Continued)

OTHER PUBLICATIONS

Article, "International Business Machines (IBM) issued new U.S. Pat. No. [9,666,225]; News Bites—Computing & Information [Melbourne] May 31, 2017.", retrieved from Dialog on May 18, 2023 (Year: 2017).*
(Continued)

*Primary Examiner* — Yogesh C Garg
(74) *Attorney, Agent, or Firm* — Foley & Lardner LLP

(57) ABSTRACT

A non-transitory computer-readable medium is configured to store instructions executable by one or more processors to perform operations including receiving, via an audio signal interface, audio data, processing the audio data to identify one or more speakers from which the audio data is produced, determining, from the processed audio data, an intention to place one or more orders, and communicating, in response to determining the intention, with at least one point-of-sale (POS) terminal to execute order processing.

14 Claims, 18 Drawing Sheets

Related U.S. Application Data

(60) Provisional application No. 62/810,837, filed on Feb. 26, 2019.

(51) Int. Cl.

| | | |
|---|---|---|
| *G06N 20/00* | (2019.01) | |
| *G06Q 20/20* | (2012.01) | |
| *G06Q 30/0601* | (2023.01) | |
| *G06Q 50/12* | (2012.01) | |
| *G10L 15/30* | (2013.01) | |
| *G10L 25/30* | (2013.01) | |

(52) U.S. Cl.
CPC ......... *G06Q 20/20* (2013.01); *G06Q 30/0641* (2013.01); *G06Q 50/12* (2013.01); *G10L 15/30* (2013.01); *G10L 25/30* (2013.01)

(58) Field of Classification Search
USPC ........................................................ 705/27.1
See application file for complete search history.

(56) References Cited

U.S. PATENT DOCUMENTS

| | | | |
|---|---|---|---|
| 8,112,272 | B2 | 2/2012 | Nagahama et al. |
| 8,799,083 | B1 | 8/2014 | Silver |
| 9,497,528 | B2 | 11/2016 | Song et al. |
| 9,710,800 | B2 | 7/2017 | Yopp et al. |
| 9,818,405 | B2 | 11/2017 | Arslan et al. |
| 9,830,906 | B2 | 11/2017 | Inose et al. |
| 10,043,173 | B2 | 8/2018 | Berlin |
| 10,068,007 | B1 | 9/2018 | Wohlsen et al. |
| 10,083,688 | B2 | 9/2018 | Piernot et al. |
| 10,089,983 | B1 | 10/2018 | Gella et al. |
| 10,360,265 | B1 | 7/2019 | Agarwal |
| 10,490,195 | B1 * | 11/2019 | Krishnamoorthy ..... G10L 17/22 |
| 10,592,706 | B2 | 3/2020 | Carpenter et al. |
| 10,628,635 | B1 | 4/2020 | Carpenter et al. |
| 10,706,846 | B1 | 7/2020 | Barton et al. |
| 10,706,848 | B1 * | 7/2020 | Greene ................... G10L 15/30 |
| 10,878,824 | B2 | 12/2020 | Carpenter et al. |
| 11,023,955 | B1 | 6/2021 | Carpenter et al. |
| 11,244,681 | B1 | 2/2022 | Siefken et al. |
| 11,810,550 | B2 | 11/2023 | Shukla et al. |
| 11,862,157 | B2 | 1/2024 | Aggarwal et al. |
| 2003/0018531 | A1 | 1/2003 | Mahaffy et al. |
| 2004/0035644 | A1 | 2/2004 | Ford et al. |
| 2004/0059571 | A1 | 3/2004 | Ohtomo |
| 2005/0065789 | A1 | 3/2005 | Yacoub et al. |
| 2005/0200455 | A1 | 9/2005 | Veni, III et al. |
| 2005/0261901 | A1 | 11/2005 | Davis et al. |
| 2006/0076397 | A1 | 4/2006 | Langos |
| 2007/0230791 | A1 | 10/2007 | Chellapilla et al. |
| 2008/0222004 | A1 | 9/2008 | Pollock et al. |
| 2009/0055178 | A1 | 2/2009 | Coon |
| 2012/0179538 | A1 * | 7/2012 | Hines ................. G06Q 30/0242 705/14.51 |
| 2012/0201362 | A1 | 8/2012 | Crossa et al. |
| 2014/0379338 | A1 | 12/2014 | Fry |
| 2015/0121216 | A1 | 4/2015 | Brown et al. |
| 2015/0193755 | A1 * | 7/2015 | Sibble ..................... H04W 4/12 705/21 |
| 2017/0278150 | A1 | 9/2017 | Tucker |
| 2017/0293905 | A1 | 10/2017 | Washington et al. |
| 2018/0308486 | A1 | 10/2018 | Saddler et al. |
| 2018/0330731 | A1 | 11/2018 | Zeitlin et al. |
| 2019/0080685 | A1 | 3/2019 | Johnson, Jr. |
| 2019/0108566 | A1 | 4/2019 | Coleman et al. |
| 2019/0259499 | A1 * | 8/2019 | Hong ..................... G16H 50/20 |
| 2020/0034848 | A1 | 1/2020 | Seo et al. |
| 2020/0226667 | A1 | 7/2020 | Kalaimani |
| 2020/0257299 | A1 * | 8/2020 | Wang ..................... G08G 1/167 |
| 2020/0311804 | A1 | 10/2020 | Buckholdt et al. |
| 2020/0380040 | A1 * | 12/2020 | Yamamuro ....... G06F 16/90332 |
| 2022/0165262 | A1 | 5/2022 | Sumpter et al. |
| 2022/0292834 | A1 | 9/2022 | Desantola et al. |
| 2023/0316788 | A1 | 10/2023 | Desantola et al. |

FOREIGN PATENT DOCUMENTS

| | | | |
|---|---|---|---|
| EP | 3 627 498 A1 | 3/2020 | |
| JP | 3629145 B2 * | 3/2005 | ............. G10L 15/20 |
| WO | WO-02/21090 A1 | 3/2002 | |

OTHER PUBLICATIONS

Cour, Timothee; "Weakly supervised learning from multiple modalities: Exploiting video, audio and text for video understanding"; ProQuest Dissertations and Theses ProQuest Dissertations & Theses. (2009 } retrieved from Dialog on Sep. 29, 2024 (Year: 2009).*

Communication pursuant to Article 94(3) EPC dated Nov. 16, 2022 issued in EP Application No. 20159571.7, 5 pages.

Communication pursuant to Article 94(3) EPC dated Sep. 13, 2022 issued in EP Application No. 20159571.7, 4 pages.

Extended European Search Report, Application No. 20159571.7, Jul. 10, 2020, 8 pages.

Final Office Action on U.S. Appl. No. 16/800,428 DTD Nov. 30, 2022.

Search Report on EP 20159571.7 DTD Jul. 10, 2020.

Garber, Amy, "Quick-service leaders eye life in the fast lane", Nation's Restaurant News 39.50: 1,83-84, 86. Lebhar-Friedman, Inc. (Dec. 12, 2005).

Non-Final Office Action on U.S. Appl. No. 16/800,428 DTD Jun. 29, 2022.

Notice of Allowance on U.S. Appl. No. 16/800,428 DTD Apr. 12, 2023.

Tanabian et al. "Accent adaptation in speech user interface"; VECIMS 2005—IEEE International Conference on Virtual Environments, Human-Computer Interfaces, and Measurement Systems 2005: 99-102. IEEE Computer Society. (Dec. 1, 2005).

Tariqullah Jan et al., Cocktail Party Problem: Source Separation Issues and Computational Methods, IGI Global, 2011, 19 pages.

Tariqullah Jan et al., Cocktail Party Problem: Source Separation Issues and Computational Methods, IGI Global, 2011, 3 pages.

* cited by examiner

SYSTEM FOR EATERY ORDERING WITH MOBILE INTERFACE AND POINT-OF-SALE TERMINAL

CROSS-REFERENCE TO RELATED APPLICATIONS

This application is divisional of U.S. patent Publication Ser. No. 16/800,428, filed Feb. 25, 2020, which claims priority to U.S. Provisional Patent Application No. 62/810,837, filed Feb. 26, 2019, which are incorporated herein by reference in their entireties.

FIELD

The present disclosure relates generally to processing orders for consumables from eateries, such as restaurants or fast-casual dining establishments, for example, and at the drive-through of eateries.

BACKGROUND

Point-of-sale (PoS) systems for order processing are present at eateries, such as restaurants and fast-casual dining establishments. PoS systems may also be used for order processing of orders at a drive-through of such eateries. Traditional order processing at eateries features the presence of both the person(s) placing the order and a worker at the eatery. Remote order processing may involve, for example, placing an order over the telephone or via the Internet.

SUMMARY

The present disclosure relates to remote ordering including remote orders made verbally. Such orders are processed in a way that may allow for differentiation among multiple contributing sources of audio, e.g., multiple persons who have generated audible data that is processed in connection with analyzing an order to be fulfilled.

According to one aspect of the disclosure, a non-transitory computer-readable medium is provided. The non-transitory computer-readable medium is configured to store instructions executable by one or more processors to perform operations including independently processing, by each of a first voice recognition processor and a second voice recognition processor, audio data relating to one or more orders; determining whether the first voice recognition processor has supplied a first indication associated with performing first language processing of the audio data, the first voice recognition processor being configured to perform one or more of the first language processing, first transcription processing, or first entity recognition processing; and selecting a result of second language processing of the audio data from the second voice recognition processor in response to determining that the first voice recognition processor has not supplied the first indication, the second voice recognition processor being configured to perform one or more of second language processing of higher quality than the first language processing, second transcription processing of lower quality than the first transcription processing, or second entity recognition processing.

According to a further aspect of an exemplary computer-readable medium, the first entity recognition processing comprises recognizing at least a portion of the audio data as relating to multiple entities.

According to a further aspect of an exemplary computer-readable medium, the second entity recognition processing comprises recognizing at least a portion of the audio data as relating to a single entity.

According to a further aspect of an exemplary computer-readable medium, the operations further comprise comparing the result of the second language processing to a result of the first language processing.

According to a further aspect of an exemplary computer-readable medium, the comparison comprises evaluating the result of the second language processing and the result of the first language processing against a plurality of criteria.

According to a further aspect of an exemplary computer-readable medium, the first processor and the second processor may be from a same provider or a different provider.

According to a further aspect of an exemplary computer-readable medium, the operations further comprise selecting the result of the second language processing when (i) the first voice recognition processor is not determined to have supplied the first indication associated with performing the first language processing and the second voice recognition processor is determined to have supplied a second indication associated with performing the second language processing, or (ii) an identifier associated with the first indication and an identifier associated with the second indication are different.

According to a further aspect of an exemplary computer-readable medium, the operations further comprise selecting a result of the first language processing in response to determining that the second voice recognition processor has not supplied a second indication associated with performing the second language processing.

According to a further aspect of an exemplary computer-readable medium, the operations further comprise selecting a result of the first language processing in response to recognizing, by the first entity recognition processing, a plurality of entities.

According to a further aspect of an exemplary computer-readable medium, the operations further comprise selecting a result of the first language processing in response to detecting, by the second entity recognition processing, a number of entities above a threshold.

According to a further aspect of an exemplary computer-readable medium, the operations further comprise evaluating the criteria sequentially and terminating the evaluation upon selection of the result of the first language processing or the result of the second language processing.

According to a further aspect of an exemplary computer-readable medium, the operations further comprise detecting, by each of the first entity recognition processing and the second entity recognition processing, a number of entities in the audio data; and selecting a result of the first language processing in response to the first entity recognition processing detecting a higher number of entities than the second entity recognition processing or selecting the result of the second language processing in response to the second entity recognition processing detecting a higher number of entities than the first entity recognition processing.

According to another aspect of the disclosure, a system is provided. The system includes at least one point-of-sale (POS) terminal comprising communication circuitry to permit wireless communication with a cloud-based computing system; at least one processor configured to: receive, via an audio signal interface, audio data; process the audio data to identify one or more speakers from which the audio data is produced; determine, from the processed audio data, an intention to place one or more orders; and communicate, in response to determining the intention, with the at least one PoS terminal to execute order processing.

According to a further aspect of one or more exemplary systems, the system includes a first voice recognition engine configured to perform one or more of a first language processing, a first transcription processing, or a first entity recognition processing, and a second voice recognition engine configured to perform one or more of a second language processing of higher quality than the first language processing, a second transcription processing of lower quality than the first transcription processing, or a second entity recognition processing.

According to a further aspect of one or more exemplary systems, the at least one processor is configured to independently process, by each of a first voice recognition processor and a second voice recognition processor, audio data relating to one or more orders; determine whether the first voice recognition processor has supplied a first indication associated with performing first language processing of the audio data, the first voice recognition processor being configured to perform one or more of the first language processing, first transcription processing, or first entity recognition processing; and select a result of second language processing of the audio data from the second voice recognition processor in response to determining that the first voice recognition engine has not supplied the first indication, the second voice recognition processor being configured to perform one or more of second language processing of higher quality than the first language processing, second transcription processing of lower quality than the first transcription processing, or second entity recognition processing.

According to a further aspect of one or more exemplary systems, the audio data is processed using machine learning to assign an individual identity to a speaker of the one or more speakers.

According to a further aspect of one or more exemplary systems, the processor is configured to process the audio data in an online mode or an offline mode.

According to a further aspect of one or more exemplary systems, the audio data is received from a static file, the Internet, or via Bluetooth.

According to a further aspect of one or more exemplary systems, the processor is configured to generate metadata comprising data relating to the intention to place the one or more orders, and to associate the metadata with the one or more speakers (e.g., generators of utterances).

According to a further aspect of one or more exemplary systems, the PoS terminal is disposed in an eatery and the processor is part of the cloud-based computing system remote from the eatery.

According to a further aspect of one or more exemplary systems, the cloud-based computing system is configured to direct the one or more orders to the PoS terminal.

According to a further aspect of the disclosure, a method is provided, the method including processing, by at least a first voice recognition processor, audio data relating to one or more orders; determining whether the first voice recognition processor has supplied a first indication associated with performing language processing of the audio data, the first voice recognition processor being configured to perform one or more of natural language processing, first transcription processing, or first entity recognition processing; obtaining a first result of the language processing from the first voice recognition processor; evaluating the first result of the language processing according to one or more criteria to determine whether the first result satisfies one or more of the criteria; and selecting the first voice recognition processor or another voice recognition processor to perform language processing of the one or more orders based on the evaluation.

A further aspect of one or more exemplary methods includes selecting another voice recognition processor to perform language processing of the one or more orders if the evaluation indicates that the first result of the language processing does not satisfy the one or more criteria.

A further aspect of one or more exemplary methods includes processing, by at least a second voice recognition processor configured to perform one or more of second language processing of higher quality than the first language processing, second transcription processing of lower quality than the first transcription processing, or second entity recognition processing, and selecting the second voice recognition processor to perform language processing of the one or more orders if the evaluation indicates that the first result of the language processing does not satisfy the one or more criteria.

A further aspect of one or more exemplary methods includes reducing noise from the audio data using a recurrent natural network de-noiser.

A further aspect of one or more exemplary methods includes transmitting an output from the first voice recognition processor to an order engine for fulfillment of an order from a speaker of the audio data.

A further aspect of one or more exemplary methods includes distinguishing between speakers of the audio data.

According to a further aspect of one or more exemplary methods, the reduction of noise is performed during generation of the audio data.

According to a further aspect of one or more exemplary methods, the one or more criteria includes a historical transcription score.

A further aspect of one or more exemplary methods includes analyzing the first result to determine whether the first result contains at least one synonym of an item available for selection among the one or more orders.

According to a further aspect of one or more exemplary methods, the first voice recognition processor and the another voice recognition processor are from a same provider or a different provider.

A further aspect of one or more exemplary methods includes distinguishing between the speakers to identify a speaker of authority for ordering.

A further aspect of one or more exemplary methods includes recognizing an item in one or more orders based on a list of menu items, at least one synonym of one or more of the menu items, or at least one homonym of one or more of the menu items.

A further aspect of one or more exemplary methods includes selecting the first voice recognition processor or the another voice recognition processor based on a result from a prior order.

It is to be understood that the foregoing description, including the summary above, and the following description are merely exemplary and are intended to provide an overview or framework to understand the claimed subject matter.

BRIEF DESCRIPTION OF THE FIGURES

The above and other aspects and features of the present disclosure will become more apparent to those skilled in the art from the following detailed description of the example embodiments with reference to the accompanying drawings, in which.

DETAILED DESCRIPTION

Hereinafter, example embodiments will be described in more detail with reference to the accompanying drawings.

The present disclosure relates to enterprises, systems and methods for processing orders. Such orders may be for food and beverages (consumable goods) from an eatery, e.g., a fast-casual restaurant, a formal sit-down restaurant, or a fast-food establishment with or without a drive-through and/or kiosk. The orders may be for consumable goods from a convenience store or a supermarket, for example. In one or more embodiments, such establishments are referred to generally as "eateries," although they may supply other goods and services and may offer no or limited dining opportunities on premises.

Remote and Drive-Through Order Processing

Figure 1:
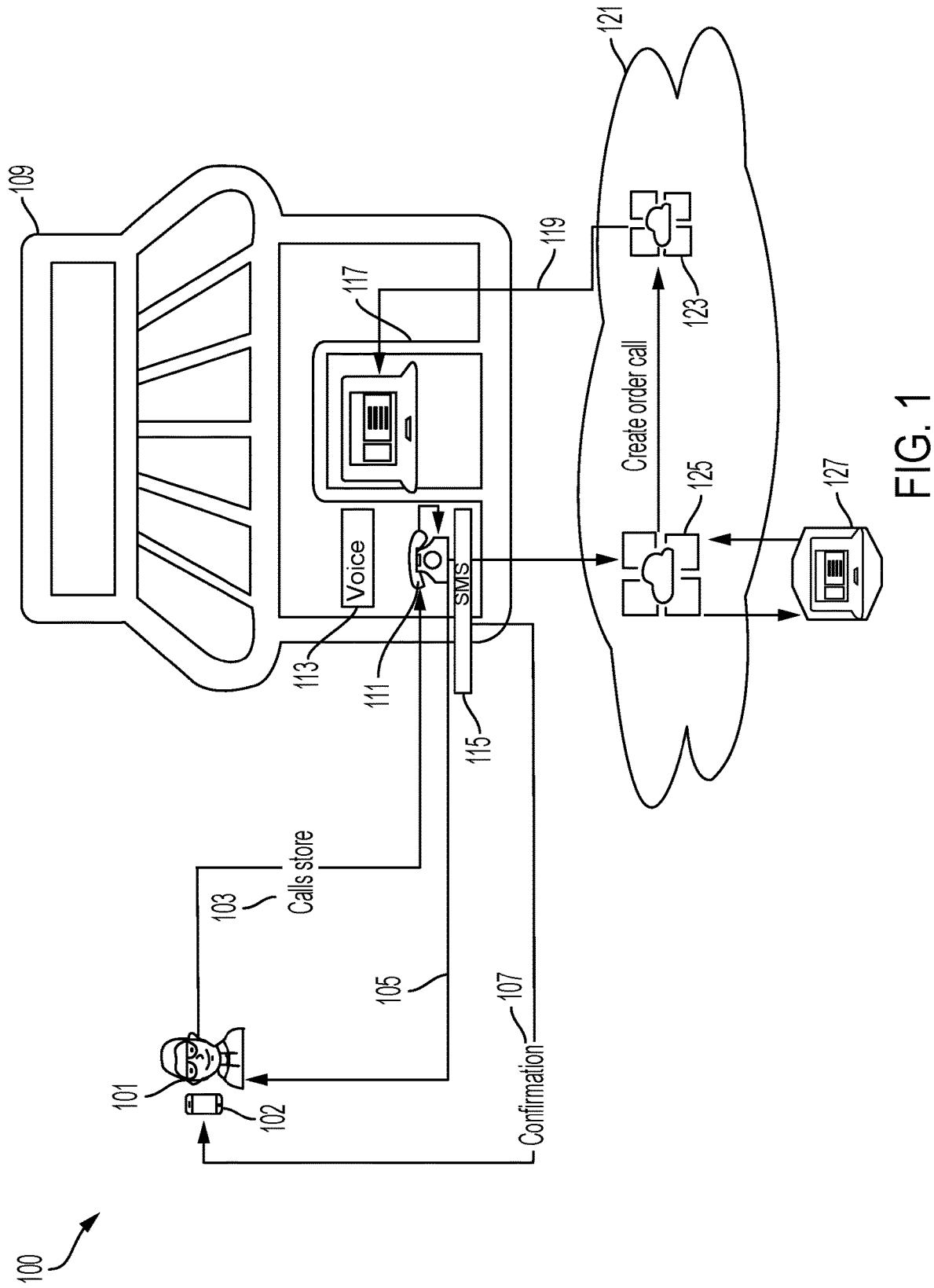
FIG. 1 is a schematic diagram of a system according to an exemplary embodiment.

FIG. 1 is a schematic diagram of a system according to an exemplary embodiment. In at least one embodiment, a system 100 is configured to accept audible input from one or more users, such as a customer 101. The audible input may be in the form of audible data and may contain linguistic information. The system 100 is configured to receive such information in one or more ways. For example, the system 100 may receive the audible input when the customer 101 calls a store 109 to place an order (e.g., a meal order for take-out or delivery).

After accepting linguistic information from a user, the system 100 is configured to process the information, act on the information, generate responses or confirmations of processing and action, and send the responses or confirmations to the user, as discussed in more detail below. The system 100 of one or more embodiments allow restaurants or other businesses to accept new orders from customers via telephone, or other audio input methods, in an automated way, without intervention by the business, or with more limited intervention by the business.

New orders may come in the form of a telephone call 103, including a landline call, a mobile cellular network call, or a voice over IP (VoIP) call, for example. In at least one embodiment, the system receives telephone calls via web-socket protocols, and meta-information regarding the telephone call via representational state transfer (REST) protocols. The system 100 answers the telephone call and presents audio prompts and messages to the user during a conversation 105. The user may create and manage an order via voice commands, spoken into a telephone 102, transmitted to a telephone service provider, forwarded to and processed by the system 100.

In at least one embodiment, the system 100 is configured to receive additional information from the customer 101 when the customer 101 additionally transmits information to the system via dual tone multi frequency (DTMF) key presses by pushing or selecting buttons on their telephone. As discussed below, commands issued by the user and accepted by the system may initiate the system to perform actions including but not limited to: adding an item to the order, adding a multiple of an item to the order, removing an item from the order, removing all items from the order, responding in the affirmative or in the negative to questions posed by the system, requesting information about an item, modifying an item that has already been added to the order, submitting button presses to amend the user origin telephone number, and transferring the call to the business.

The system 100 is configured to perform such functions by interacting with a number of other systems including a telephony provider 111 with web-socket capabilities, a short message service (SMS) messaging provider with REST protocol capabilities, voice recognition services, natural language processing services, PoS interfaces, databases, and any number of REST protocol application program interfaces (APIs) to accept and process customer submitted order information.

In at least one embodiment, the customer 101 initiates an order using the customer's communication device, such as mobile device 102 (e.g., a smartphone). The customer 101 places a call 103 to the store 109 to order take-out by having a conversation 105, for example. The conversation 105 may include a series of spoken or textual statements with a beginning, end, and any combination of questions, answers, and statements in between. The call 103 is placed through a telephony provider such as a third party company capable of sending and receiving audio telephone calls and communicating with a voice recognition system 125 via web-socket protocols and REST protocols. The interaction between the customer 101 and store 109 may also take place using SMS communication, including via an SMS provider, such as a third party company capable of transmitting and receiving SMS text messages, and communicating with a voice recognition system 125, discussed below, via REST protocols.

During the conversation 105, it is expected that the customer 101 will attempt to convey an intent, meaning the objective of the customer in any interaction with the system 100. The intent may relate to one or more entities, where each entity is the subject of an intent. The customer 101 may use at least one utterance, e.g., a spoken or written phrase or sentence, to express or contextualize an intent. For example, the intent of the utterance "I would like one coffee" is "add item," and the entities of the utterance are "one" and "coffee," i.e., a quantity and a particular item offered by the store 109.

The conversation 105 may be used to generate a transcript, e.g., an estimated textual representation of a spoken word utterance. The conversation 105 typically includes a dialog supplied via a voice API 113. The dialog may include, for example, a branch of a conversation including an aside or a series of questions which require input from the customer 101 in order to fulfill the intent of the customer 101. In order to process the audio information from the customer 101, the voice API 113 transmits the audio information to the voice recognition system 125, which may also be referred to as a voice recognition processor. The voice recognition system 125 includes programmed circuitry, such as a communication interface or network interface card, for communicating with a voice recognition engine 127 (a voice recognition processor), which may be implemented as a computer system in some embodiments. In some embodiments, the voice recognition system 125 may be integrated with the voice recognition engine 127 as an integrated voice recognition processor.

In at least one embodiment, once the conversation 105 is completed, an optional SMS confirmation 107 is delivered by an SMS API 115 in communication with the voice API 113. For example, the voice API 113 may send a notification to the SMS API 115 indicating that an order has been communicated, prompting the SMS API 115 to send a confirmation to the mobile device 102 of customer 101. In at least one embodiment, a customer identification (ID) for customer 101 may be assigned according to an incoming phone number, e.g., the telephone number identified as the number used to place the call 103. In some embodiments, a name for the order may be assigned to aid in order identification when the customer 101 goes to the store 109 for order pick-up. The order name may be randomized. In some embodiments, the order name may be selected from one of a predetermined list of potential order names. In some embodiments, the order name may be selected from a list of known words as opposed to a lengthy alphanumeric string, for example, so that the customer 101 is more likely to remember the order name when picking up the order from store 109.

The voice recognition engine 127 may include, in at least one embodiment, a third party or a first party system designed to accept, as input, the digitally encoded audio representation of an utterance, or the text representation of an utterance, and return, as output, a transcript of the input (in the case of audio input), and an intent or multiple intents referencing zero or more entities relating to the input. In at least one embodiment, upon receiving the audio information through the voice API 113, the voice recognition engine 127 includes a natural language processor (NLP) that outputs a transcript to the voice recognition system 125, which in turn transmits the transcription information to an order submission API 123.

In various embodiments, the NLP analyzes the received utterance data using any suitable machine learning method to determine the content of the utterance. For example, the processor may utilize machine learning to analyze the semantics and/or syntax of the utterance using any suitable methods, for example, such as lemmatization, segmentation, tagging, parsing, disambiguation, stemming, extraction, lexical semantics, machine translation, relationship extraction, sentiment analysis, topic segmentation and recognition, speech recognition, text to speech, any other suitable methods, or any combinations thereof. In various embodiments, the processor determines whether or not the utterance includes an indication of an intention to place an order, and the contents of that order.

The voice recognition system 125 communicates customer order placement intent to the order submission API 123, which in turn subsequently sends a message 119 to communicate the customer's order to an in-store PoS terminal 117. In at least one embodiment, the voice recognition system 125, the voice recognition engine 127 and the order submission API 123 are provided in a cloud computing network system 121.

The PoS terminal 117 may include a computer having a processor and a memory and configured to display at least one graphical user interface (GUI). The computer is configured to display customer orders, sort or re-order customer orders, and communicate with other hardware components of the terminal 117 (which may include, for example, a display screen or microphone). The computer of the PoS terminal 117 is configured to execute code (e.g., network code) designed to input customer orders and communicates with the cloud system 121 and/or with hardware at the store 109 (e.g., a payment processing device that may be physically separable or separated from the PoS terminal 117).

In some embodiments, one or more handheld devices such as tablets may be used instead of or in addition to a dedicated terminal 117. For example, the tablet may be provided with one or more of the same services as those provided for terminal 117 (e.g., telephone order capability, SMS text capability, and/or chat order capability through a 'chat-bot'). Where the customer 101 uses a call 103 to place an order, voice recognition for order processing is not performed by the terminal 117 or by a tablet, but may be performed remotely (e.g., through cloud system 121 as described herein), and then the order may be collected/retrieved by the terminal 117 from the cloud system 121.

In at least one embodiment, a customer 101 calls a restaurant (an example of store 109) to place an order for take-out. The telephone call is answered by a voice ordering platform, e.g., the voice API 113. The voice ordering platform may be accessed via a mobile application stored on the mobile device of a customer 101. The voice ordering platform interacts with a configuration management platform in the cloud system 121 to obtain menu items specific to the restaurant. In some embodiments, the voice API 113 sends the SMS API 115 an indication that an SMS order confirmation should be sent because the customer 101 has opted in to receive such messages, or, alternatively, that no message should be sent. The voice API 113 sends the order to the voice recognition system 125 and the voice recognition engine 127, and the order is in turn transmitted to the order submission API 123, which in turn sends the order to the in-store PoS terminal 117. The order is then prepared at the store 109. The customer 101 then visits the store 109, pays for the order at the PoS 117 or another PoS, and receives the customer's order. In some embodiments, a representative of the customer 101—e.g., an acquaintance or a third party such as a commercial meal delivery service—may be pick up the order. In some embodiments, the third party may use a mobile application that is integrated with or configured to communicate with the mobile application through which the customer 101 interacts with voice API 113. In some embodiments, the menu information is accessible via the cloud computing network system 121, such that the voice recognition system 125 can perform order processing using known menu items. That is, the menu is part of the configuration management for the interaction between the store 109 and the cloud computing network system 121.

In some embodiments, the store 109 may subscribe to a service to gain access to the cloud computing network system 121, the APIs 113, 115 and 123, the voice recognition system 125 and voice recognition engine 127. The store 109 may have one or more telephone lines to facilitate order processing, and may have a line utilizable for routing a call to an operator for person-to-person processing. The subscription service may assign an alphanumeric order number for each customer order, as an order identification, and may record a caller ID of the customer as a further form of identification.

The following exemplary conversation describes an illustrative order for take-out using the system 100. The voice API 113 may dialogue with the customer 101 and cause an output in the form of an automated (digital) assistant. When the customer 101 calls the store 109, the customer 101 hears a greeting from the assistant as follows: "Hello, please press one to place an order. For a menu please visit www.eatery-name.com." When the customer 101 presses one, the customer then is asked by the assistant, "What would you like to order today?" The customer 101 may then say, for example, "I want a falafel." The assistant may then identify the general entity (falafel) but request further information by asking "Please specify what you are referring to? Falafel platter, falafel sandwich, falafel appetizer or falafel side." The customer 101 may then clarify "Falafel appetizer." The assistant may cause a falafel appetizer to be added to an order and confirm "One falafel appetizer was added. Do you want to add anything else?" The customer 101 may then say, "I want a burger." The assistant would then ask for clarification if the requested item is not found on the menu for the store 109: "Sorry, I'm having difficulty understanding. Could you please repeat?" The customer may then say, for example, "I want a shish kefte." The assistant may repeat the process of adding the order item and asking whether any other items should be added: "One shish kefte platter was added. Do you want to add anything else?"

The customer 101 may then add an additional item, e.g., by stating "I want a falafel sandwich." The assistant may then inquire whether any upgrades or promotional items are desired, e.g., by asking "Would you like to upgrade the bundle for $2.99 each?" If the customer 101 declines, the assistant then confirms the new item addition (without the upgrade) and repeats the inquiry for adding more items, "One falafel sandwich was added. Do you want to add anything else?" The customer 101 may make order adjustments, e.g., deleting items, by stating, for example, "Remove the shish kefte." The assistant may then confirm the deletion, stating "Shish kefte platter was removed from the order. Do you want to add anything else?" If the customer declines, the assistant then confirms, "You ordered one falafel appetizer, one falafel sandwich, is your order correct?"

If the customer 101 responds in the affirmative, so as to confirm the correctness and completeness of the order, the assistant then provides order information, including indicating an order total and order name. For example, the assistant may state "Your order total including taxes is $10.98. Your order name is Order1. You can use this name or the phone number you are calling from to pick up your order at the store. Your order will be ready for pickup in 15 minutes. Would you like to repeat your order information?" If the customer 101 says "Yes," the assistant may then state "You ordered one falafel appetizer, one falafel sandwich. Your order total including taxes is $10.98. Your order name is Order1. Would you like to repeat your order name?" If the customer declines, the assistant concludes "Thank you for ordering at (eatery name). It was a pleasure serving you."

Figure 2:
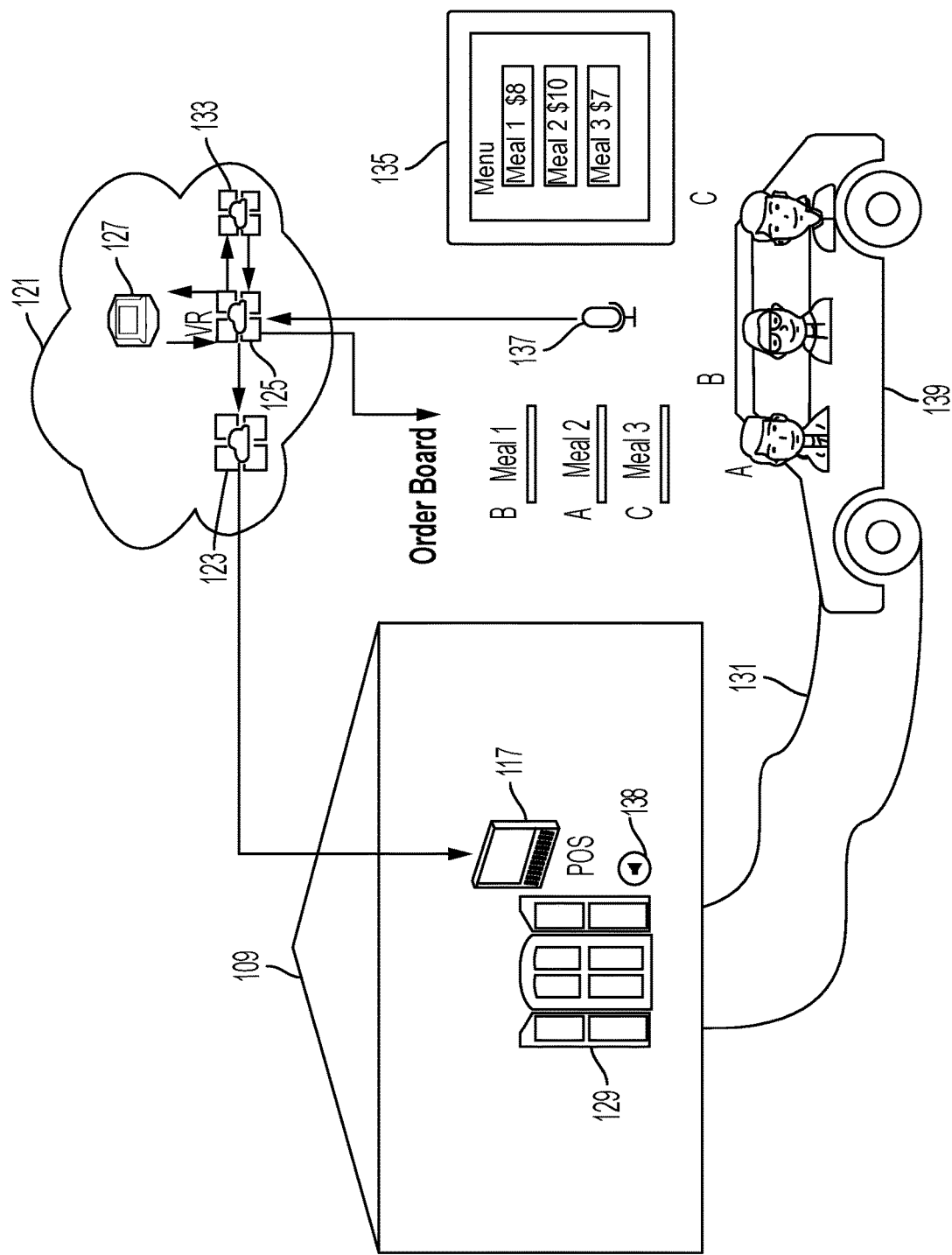
FIG. 2 is a schematic diagram of a drive-through system according to an exemplary embodiment.

FIG. 2 is a schematic diagram of a drive-through system according to an exemplary embodiment. The store 109 shown in FIG. 2 is a restaurant including a window 129 where customer 101 can pay for an order or pick up an order, the window 129 being adjacent to a driveway or road 131. The drive-through may be provided with one or more microphones 137 and/or speakers 138. One or more customers 101 visit the drive-through location (e.g., in a vehicle 139) and place the order by interacting with a digital order board containing a drive-through menu 135. The digital order board may have integrated therein or be in communication with microphone 137 and/or speaker 138. As shown in FIG. 2, customers 101 include customers A, B and C. Customers A, B and C interact with the order board having the drive-through menu 135.

In some embodiments, one or more handheld devices such as tablets may be used in connection with order processing for the drive-through. For example, an adapter may be connected to headset equipment and/or to the drive-through speaker 138 that receives audio signals from by the microphone 137. The adapter may, in some embodiments, receive the audio signals, filter and/or amplify the audio signals, and send the raw, filtered and/or amplified audio signals for language processing to be performed either remotely or in the store 109. In some embodiments, the adapter may be configured to operate with a plurality of different headset/speaker systems.

In at least one embodiment, the order board may receive orders from customers A, B and C. Customer B may order Entrée 1, Customer A may order Entrée 2, Side 1, and Beverage 1, and Customer C may order Entrée 3, by way of example. The customers communicate their orders verbally such that their utterances are picked up by the microphone 137 and transmitted to the cloud computing network system 121. The cloud computing network system 121 shown in FIG. 2 includes a data management (DM) API 133 in addition to components shown in FIG. 1. The DM API 133 includes a content management system which may be used by the subscription service that offers access to subscribers (stores 109 or groups of stores 109) to the cloud computing network system 121. The DM 133 allows the subscription service to configure client company settings and other information pertaining to the operation of specific stores or groups of stores. The voice recognition system 125 may, in some embodiments, leverage data received from multiple stores 109, including in some embodiments stores 109 with different ownership and/or brands, for machine learning and natural language processing techniques.

In at least one embodiment, the system 100 allows for in-car ordering. In-car ordering is similar in some aspects to drive-through ordering, but allows for order placement using a voice application (e.g., the voice API 113 or an application offering similar functionality as the voice API 113) that may be accessible through a mobile device or through communication circuitry in the car itself (e.g., independent of proximity to a drive-through). The voice application may be built on the Android™ platform made by Alphabet Inc. of Mountain View, CA, or may be accessible via iOS Car Play™ made by Apple, Inc. of Cupertino, CA, which allows vehicle occupants of vehicle 139 to access iPhone™ features while driving, for example. In such embodiments, the customer 101 places an order inside the car using the voice application. The voice application then communicates with the telephony provider 111, and order processing takes place using the cloud computing network system 121 as described above.

In some embodiments, a customer 101 may place an order via a kiosk. The kiosk may use a voice application such as the voice application used for in-car ordering. As with the drive-through system, the kiosk may have one or more microphones 137 and/or speakers 138. The kiosk may be provided at a different store than the store with the drive-through window 129 or may be provided at a same store, in a different location. In some embodiments, the kiosk may be in a public space remote from store 109 and may offer self-service. For example, the kiosk may be an unattended location where access to items is available on a self-service basis once the customer 101 places an order.

FIG. 3 is a process diagram according to an exemplary embodiment, showing a process S100 carried out at least in part by system 100. The process S100 includes processes performed by one or more of the following: the order submission API 123, an operator (at a store 109 or a remote help desk), the voice recognition system 125, and the customer 101, as described in more detail below. The following examples include representative parts of a conversation 105 that may occur in a sequence as prescribed by process S100. It should be appreciated that the specific sequence and order content are illustrative only and are non-limiting in nature.

As shown in FIG. 3, the process S100 is started (S101) when a customer calls the store 109. The voice API 113 facilitates interaction with the customer 101 via an automated assistant. The assistant provides a greeting (S103), such as "Hi, welcome to Voice Ordering, what would you like to order today?" The system 100 causes the API 113 to send a task to the order submission API 123 to create an order (S105). The order submission API 123 then creates an order (S107).

In response to the greeting prompt, the customer 101 may make one or more utterances (S109) that the voice API 113 parses as, "Let me get [quantity][item], [quantity],[item] with [modifier], a [item] without [modifier] and [Side1], [Side2]." The customer 101 may add to the order or remove items from the order. The customer may modify the order by requesting that a certain item be altered, e.g., a condiment may be provided in "extra" or "light" amounts. The customer 101 may modify their order by adding items, specifying "no," "extra" or "light" amounts of particular items, such as garnishes, condiments, toppings, sauce quantities, etc., and may remove either a particular quantity of an item or the item in its entirety.

In this manner, the voice API 113 interacts with the customer to acquire utterance data relating to the type and quantity of items to be ordered and modifications to particular items and/or to the order as a whole. Once the customer's utterances are completed, the voice recognition system 125 determines whether the utterances are understandable (S111). The voice recognition system 125 may determine whether the utterances are understandable by pre-configuring a list of known menu items into the system 125, and then identifying matches between the listed words and the utterances interpreted to be menu items or non-menu items. For example, if the customer 101 orders "fries on the side," the system 125 may process the utterances as "fireside," and may be trained to recognize the utterance as relating to a specific menu item (a side order of fries).

In particular, the system 125 may be configured to recognize an item in one or more orders based on a list of menu items, at least one synonym of one or more of the menu items, or at least one homonym of one or more of the menu items. The menu may contain made-up or brand-specific words rather than dictionary words, which may lower the rate of transcription to non-menu words. If the utterances are not understandable, the assistant requests the customer 101 to repeat the order, e.g., by stating "Sorry, I am having difficulty understanding, could you please repeat?" (S115). The customer 101 then repeats the order (S109) and then the voice recognition system 125 determines whether the repeated order is understandable (S111). If, after a repeat of the order, the voice recognition system 125 cannot understand the order, the assistant may provide an indication such as "I am still facing difficulty understanding. Please wait as I route your call to the operator" (S115). The call may then be routed to an operator for human-to-human interaction (S117).

Figure 3A:
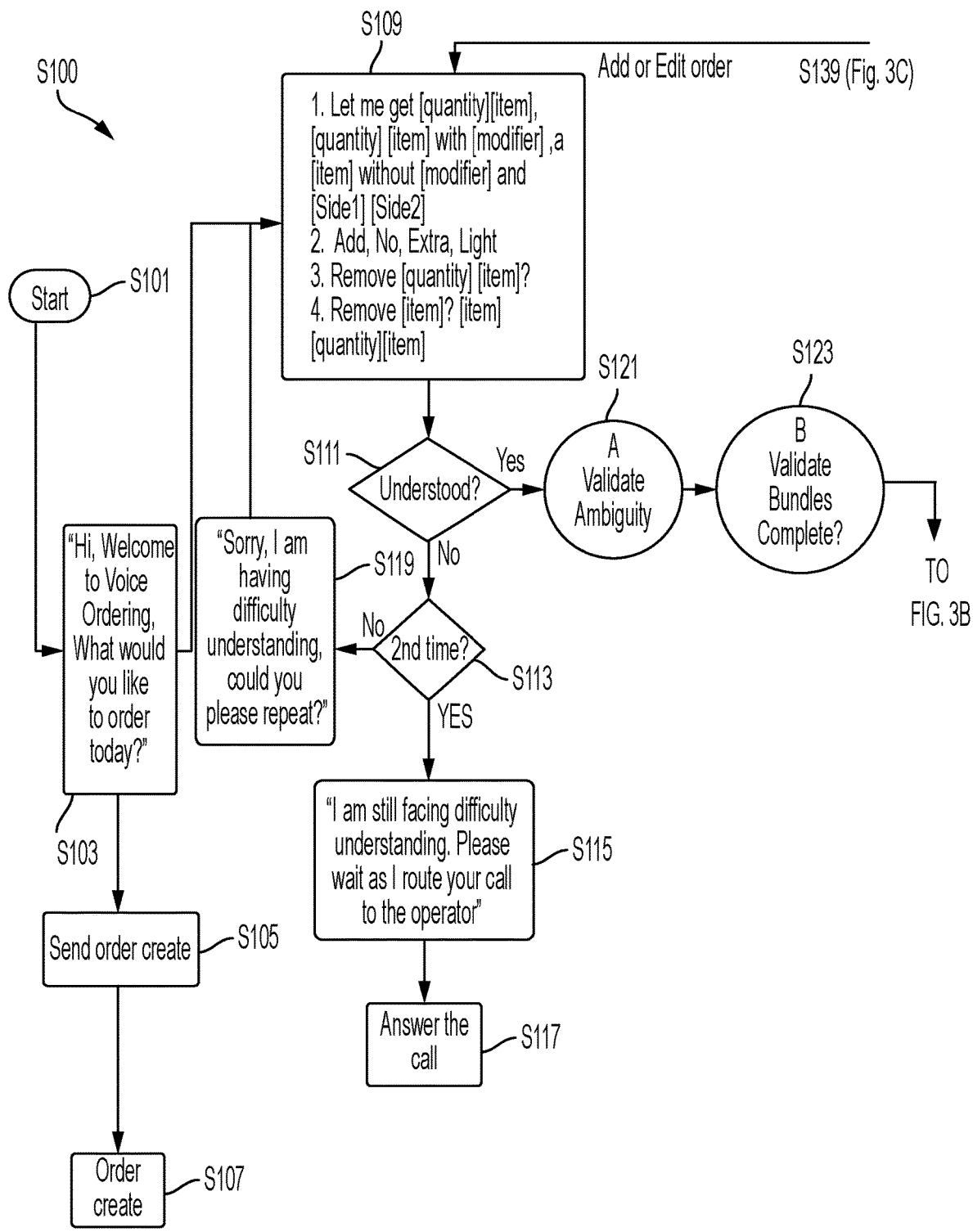
FIG. 3A is a process diagram according to an exemplary embodiment.

When the customer's order is understood, the voice recognition system 125 then performs voice processing to validate ambiguity in the utterances of the customer (S121), as discussed in more detail below. As shown in FIG. 3A, the voice recognition system 125 then performs validation of bundled items in the order (S123), as discussed in more detail below. For example, a bundle of items may include multiple meal items where ordering of one item entitles the customer to obtain another item, such as ordering an entrée where the order of the entrée entitles the customer to a choice of one of a number of side salads.

Figure 3B:
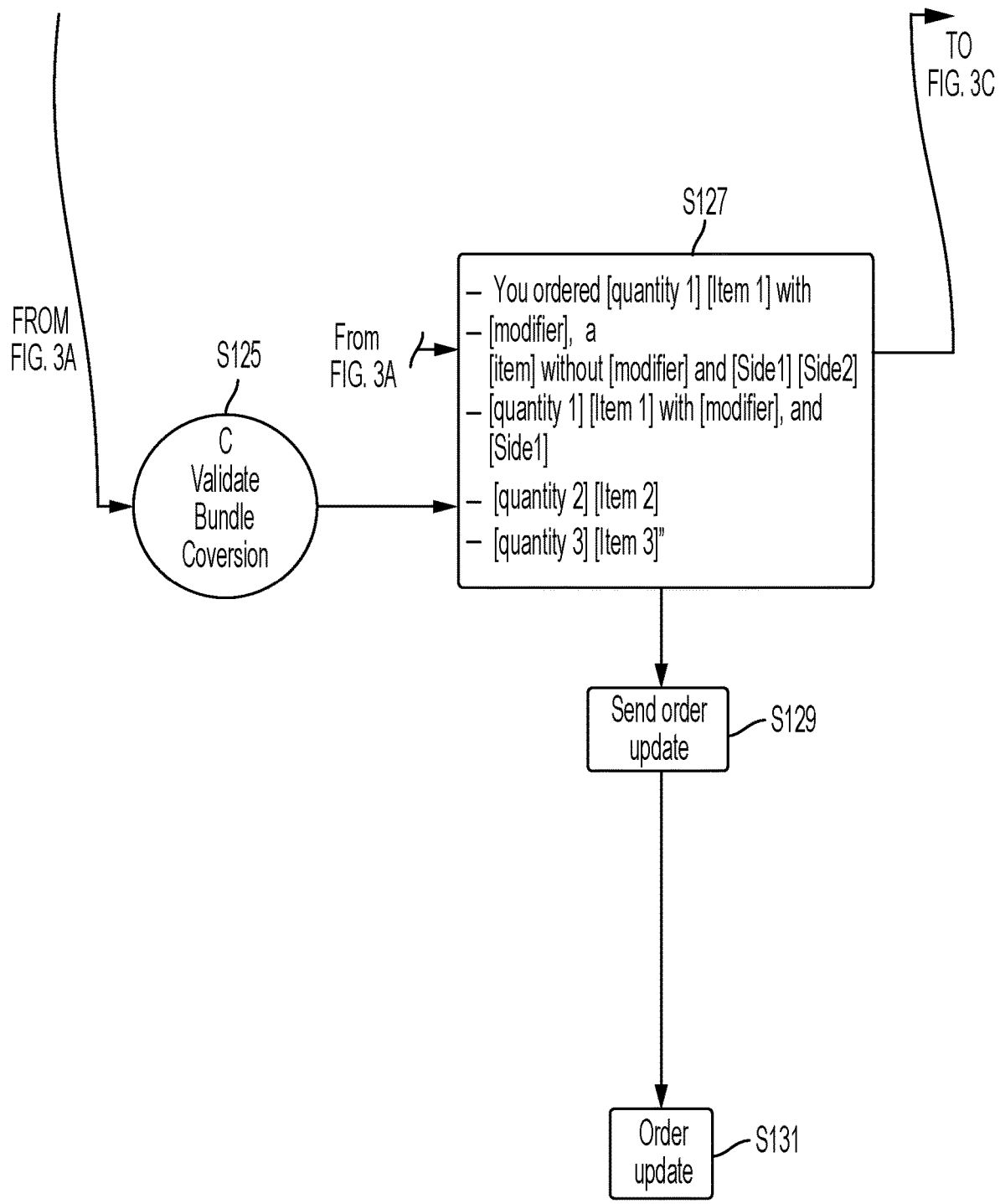
FIG. 3B is a process diagram representing a continuation of processing shown in FIG. 3A, according to an exemplary embodiment.

The validation is performed to determine whether the customer has ordered bundled items and whether the system has correctly recognized that the items belong in a bundle, for example. Next, as shown in FIG. 3B, the voice recognition system 125 performs combination conversion validation (S125) to validate whether orders of multiple items contain a "bundle," that is typically an advertised combination of items offered for a price lower than if the items were purchased separately. A "bundle" may be commonly understood as a "combo meal" or combination of items being offered together for purchase rather than a collection of discrete individually ordered items.

Once the validations (S121, S123, S125) are complete, the assistant may then confirm the order, stating for example, "You ordered [quantity 1] [item 1] with [modifier], a [item] without [modifier] and [Side1], [Side2], [quantity 1] [item 1] with [modifier], and [Side1], [quantity 2] [item 2] [quantity 3] [item 3]" (S127). The voice recognition system 125 may then send the order update to the order submission API 123 (S129) which in turn updates the order (S131).

Figure 3C:
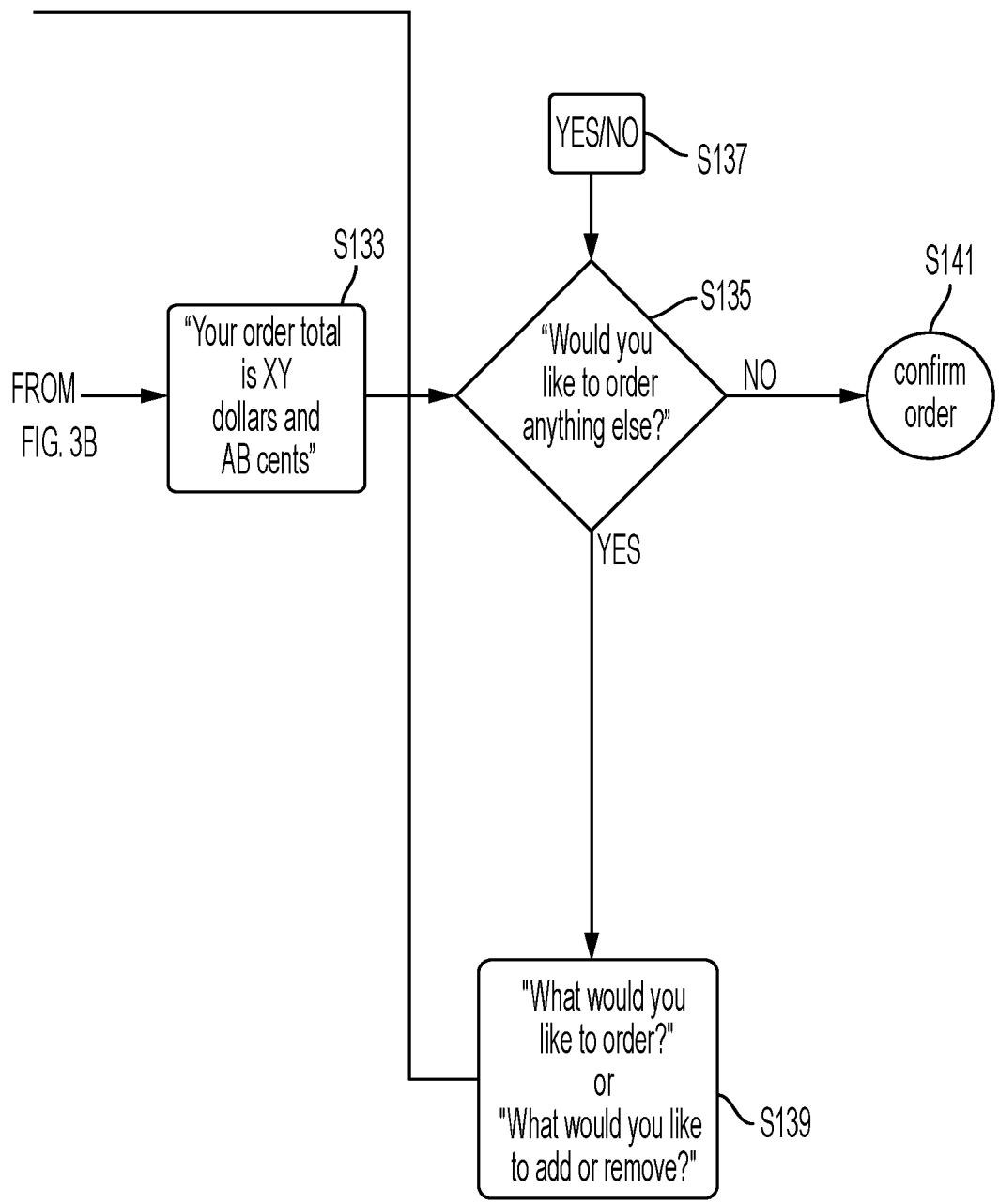
FIG. 3C is a process diagram representing a continuation of processing shown in FIG. 3B, according to an exemplary embodiment.

As shown in FIG. 3C, once the order confirmation is complete, the assistant may then output an order total, e.g., stating "Your order total is XY dollars and AB cents" (S133). The assistant may then offer an opportunity for order modification, asking "Would you like to order anything else?" (S135). If the customer 101 answers affirmatively (S137), the assistant then prompts further input, asking, for example, "What would you like to order?" and/or "What would you like to add or remove?" (S139). If the customer 101 declines to modify the order, the assistant then finally confirms the order (S141).

Figure 4:
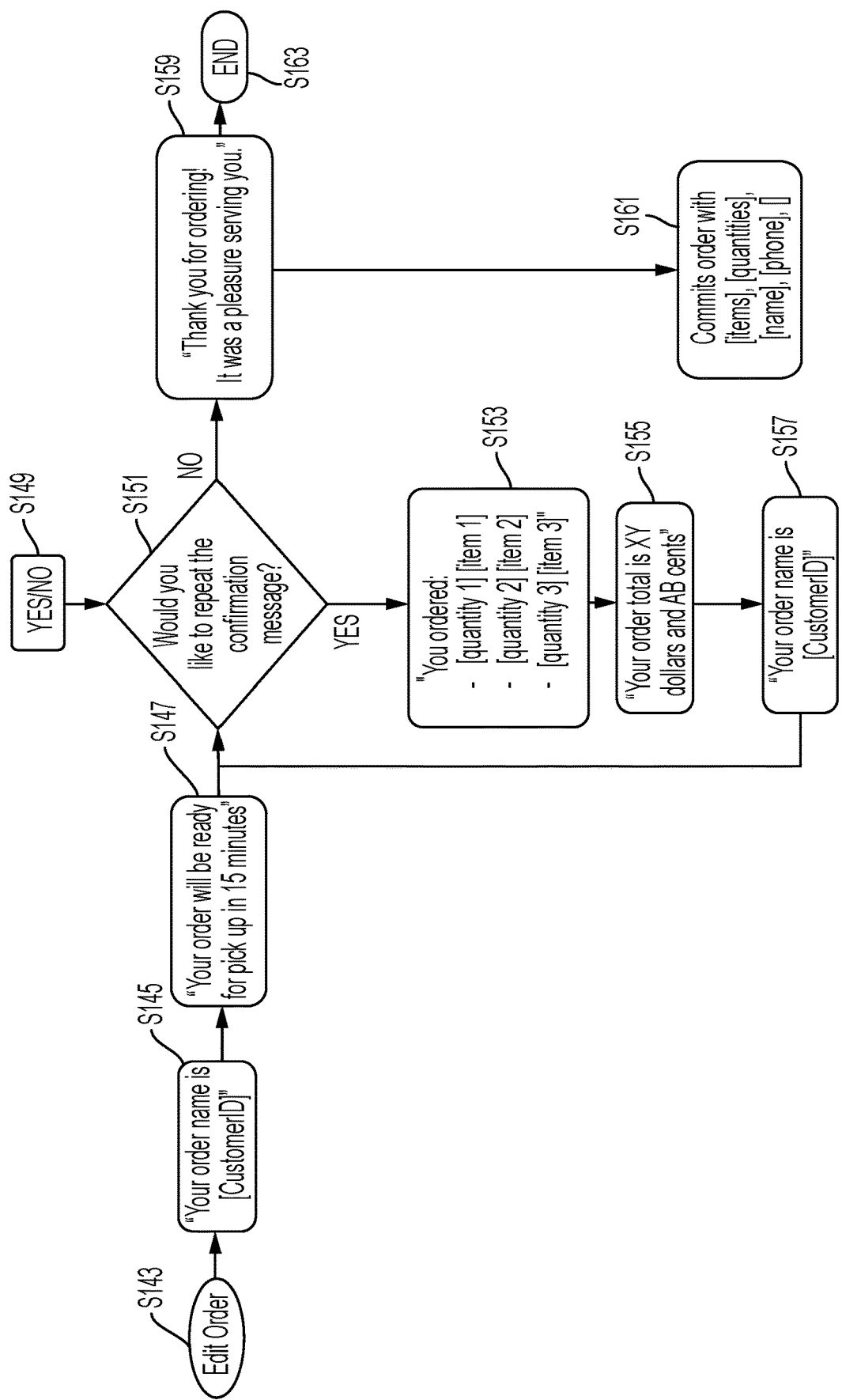
FIG. 4 is a process diagram according to an exemplary embodiment.

FIG. 4 is a process diagram according to an exemplary embodiment. The process shown in FIG. 4 is an optional subroutine of process S100 shown in FIG. 3 and pertains to processing for confirming and/or editing an order. Editing an order (S143) may occur when a customer voluntarily chooses to modify the order on the customer's own accord or may occur when the store 109 informs the customer that a particular item is unavailable or that an expected wait time may exceed a threshold. In some embodiments, following order confirmation (S141), the customer may then edit the order (S141).

After initiating an edit, the customer is apprised by the assistant of the voice recognition system 125 of the customer's order name, for example, through a notification that "Your order name is [Customer ID]" (S145). The assistant may then provide a time estimate for order readiness, e.g., "Your order will be ready for pickup in 15 minutes" (S147). The assistant may then query whether the customer wishes to hear the confirmation message again, asking "Would you like to repeat the confirmation message?" (S151). If the customer 101 answers affirmatively (S149), then the assistant repeats the order summary, stating, for example, "You ordered: [quantity 1] [item 1] [quantity 2] [item 2] [quantity 3] [item 3]" (S153). The assistant may then confirm the order total and name, stating "Your order total is XY dollars and AB cents" (S155) and "Your order name is [Customer ID]" (S157). The assistant then concludes the conversation 105 with a farewell, stating "Thank you for ordering at Voice Ordering. It was a pleasure serving you," for example (S159). If the customer declines to hear the confirmation (at S149), then the assistant provides the conclusion/farewell message (S159). The voice recognition system 125 then commits the order (in at least one embodiment, with data such as [items], [quantities], [name], [phone]) for order processing and provides this information to the cloud computing network system 121 (S161). The confirmation and/or editing of the order then concludes (S163).

Figure 5:
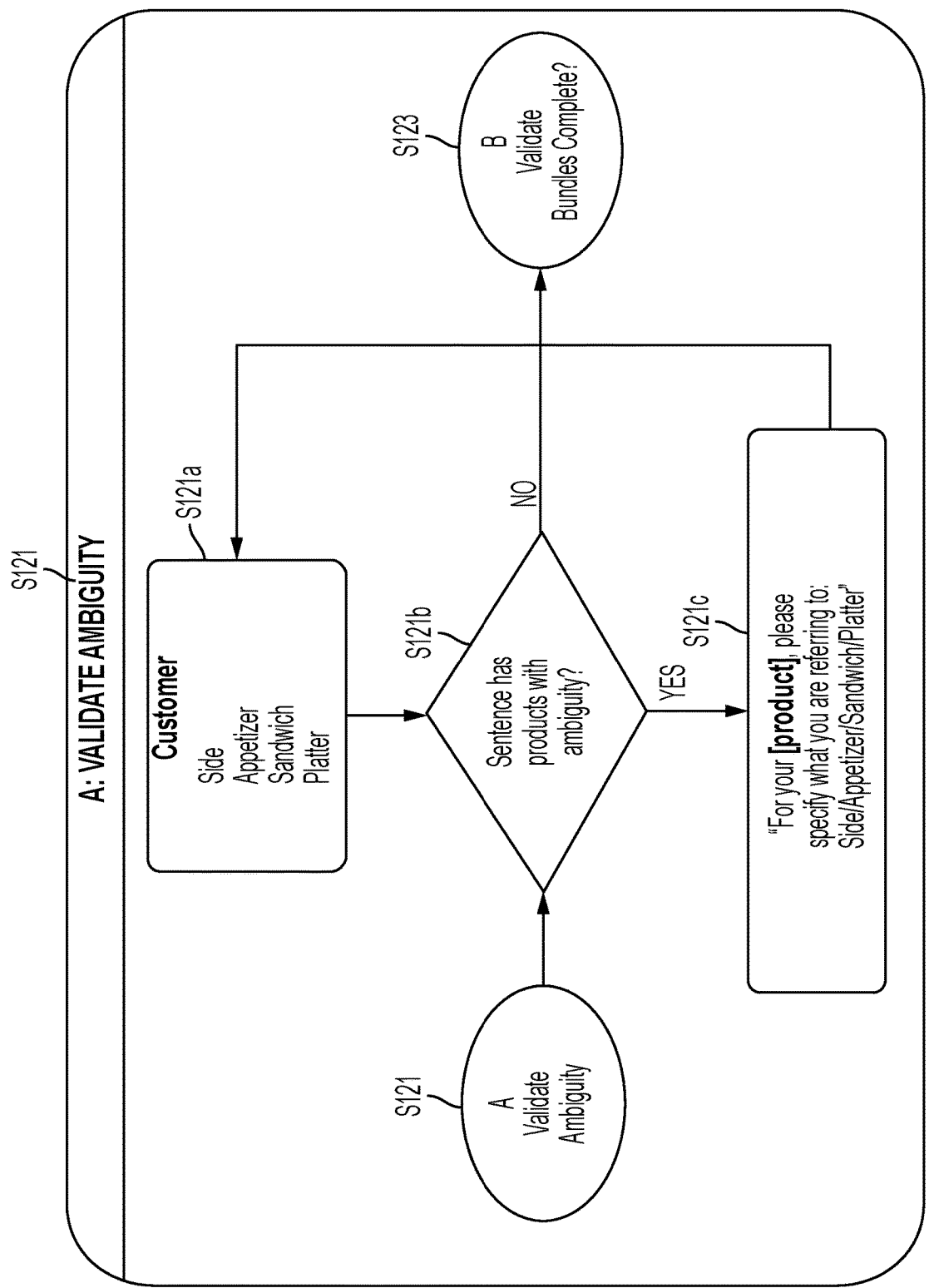
FIG. 5 is a process diagram according to an exemplary embodiment.

FIG. 5 is a process diagram according to an exemplary embodiment. The process shown in FIG. 5 is a subroutine of process S100 for validation of ambiguity (S121) in processed audio data from customer 101. The customer's utterances relating to specific entities the customer has an intention to purchase are inputted into the voice recognition system 125, e.g., via voice API 113 (S121a). For example, the customer may make utterances indicating an intention to buy the entities of one side, one appetizer, one sandwich, and one platter. The voice recognition system 125 then determines whether the sentence(s) of the customer 101 identify products with ambiguity, e.g., whether the customer has ordered a falafel sandwich or a falafel platter (S121b).

If the sentence is deemed to have ambiguity, then the assistant prompts the customer 101 to clarify the customer's intention, asking, for example, "For your [product], please specify what you are referring to: Side/Appetizer/Sandwich/Platter" (S121c). On the other hand, if no ambiguity is detected, then the process proceeds to validation of bundles (S123). The ambiguity may be detected based on one or more synonyms and/or homonyms associated with particular meal items. The voice recognition system 125 is configured to identify synonyms of a particular utterance with respect to the menu list inputted into the system. In particular, the voice recognition system 125 may analyze a first natural language processing result and/or first transcription result to determine whether the first result contains at least one synonym of an item available for selection among the one or more orders. For example, a "patty" may refer to a chicken or a beef patty, so when the customer 101 orders a patty, the voice API 113 may inquire which patty and may identify multiple types of patties to clarify the item to be ordered. That is, the detection of a synonym may prompt the API 113 to perform further operations to address the ambiguity associated with the synonym.

The natural language processing (e.g., from first or second language processing) may be performed for a given segment of audio data. The transcript processing may be performed for a transcript generated in connection with the same segment of audio data, and the entity recognition processing may likewise be performed in connection with the same segment. For example, the natural language processing evaluation may entail determining whether the natural language processor has correctly identified 'patty' as an intended item for customer 101 to purchase, the transcript evaluation may determine whether 'patty' appeared in a text transcript, and the entity recognition evaluation may determine how many patties the customer 101 indicated an intention to purchase.

Figure 6:
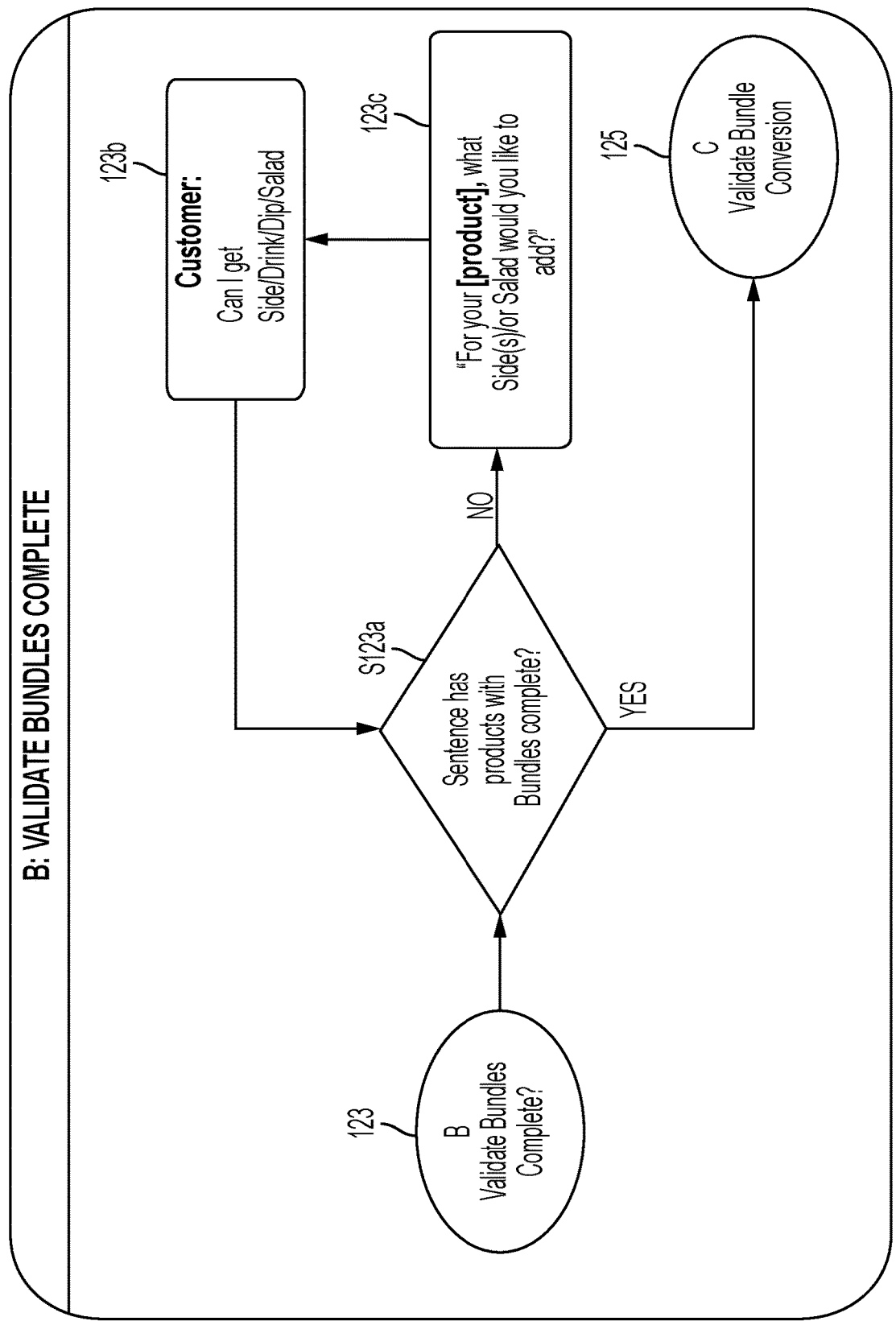
FIG. 6 is a process diagram according to an exemplary embodiment.

FIG. 6 is a process diagram according to an exemplary embodiment. The process shown in FIG. 6 is an optional subroutine for validating bundles (S123) in a customer order. The voice recognition system 125 determines whether the customer's utterance(s) identify items eligible for bundling and whether the bundles have been completed (S123a). If the voice recognition system 125 determines that the customer's utterance(s) have potential items for bundling, but the bundle has not been processed (S123a, No), the assistant then queries the customer 101 to fulfill/complete the bundle. For example, the assistant may ask "For your [product] what side(s) or salad would you like to add?" (S123c). The customer may then order such items or ask about eligibility for the bundled items, e.g., by asking "Can I get a side/drink/dip/salad?" (S123b).

Figure 7:
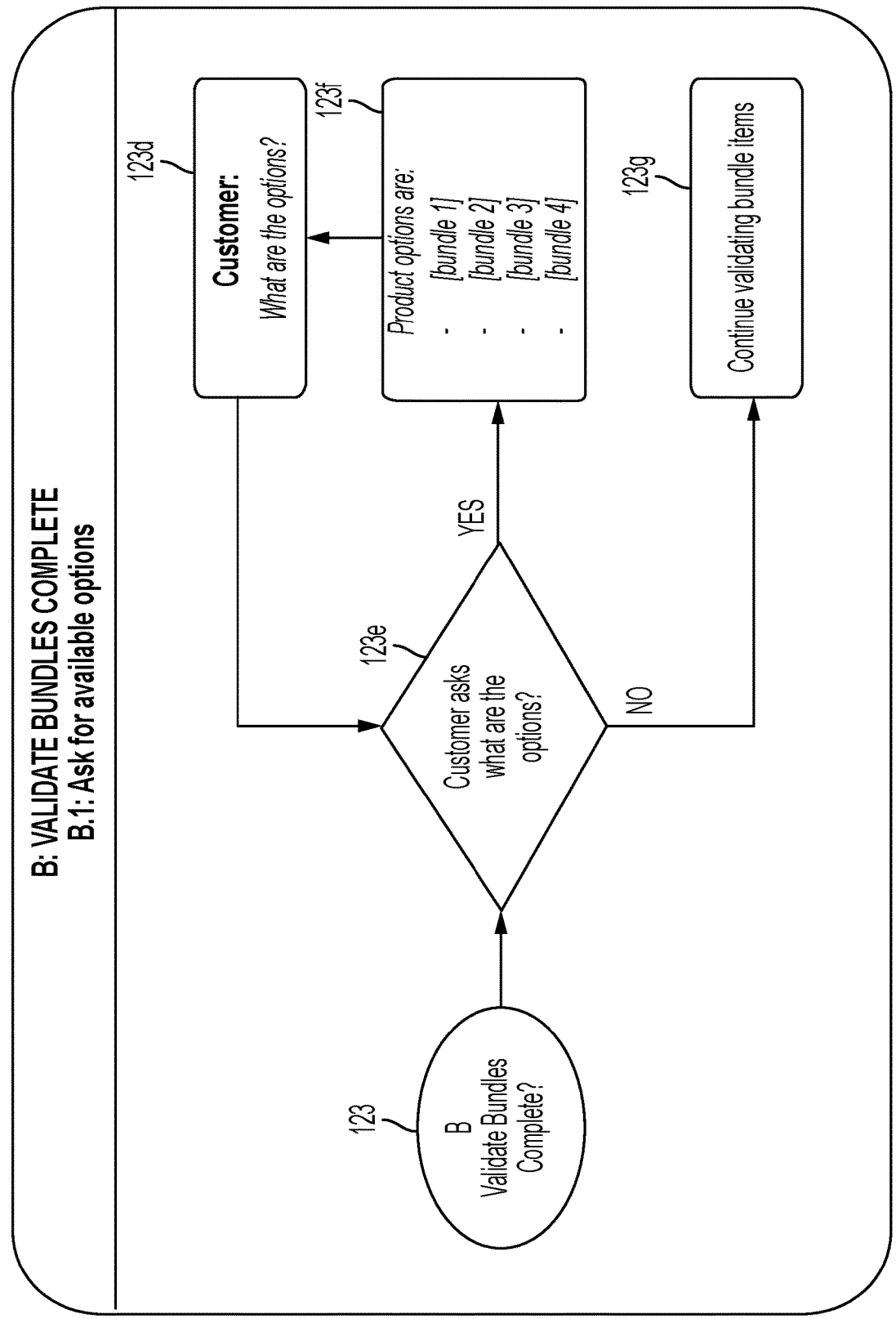
FIG. 7 is a process diagram according to an exemplary embodiment.

In validating bundled items, the bundles may not be completed/fulfilled simply because the customer 101 is unaware of or unsure of which items are eligible for inclusion in the bundled order. FIG. 7 depicts an optional subroutine of process S100 when the customer 101 asks for available options. For example, the customer may ask what options exist for bundling (S123d). The voice recognition system 125 then determines whether the customer has asked about the available options (S123e). If the customer is determined to have asked about the options, the assistant then names the various items available for bundling, e.g., by specifying that the product options include [bundle 1], [bundle 2], [bundle 3], [bundle 4], etc. (S123f). On the other hand, if the customer is not determined to have asked, then the process continues with the validation of bundled items (S123g). The process S100 then returns to the subroutine shown in FIG. 6 to the decision analysis of whether the customer's utterances have products with bundling and whether the bundling has been completed (S123a). When the bundling is determined to be complete (S123a, Yes), the process continues to validation of combination conversion (S125).

Figure 8:
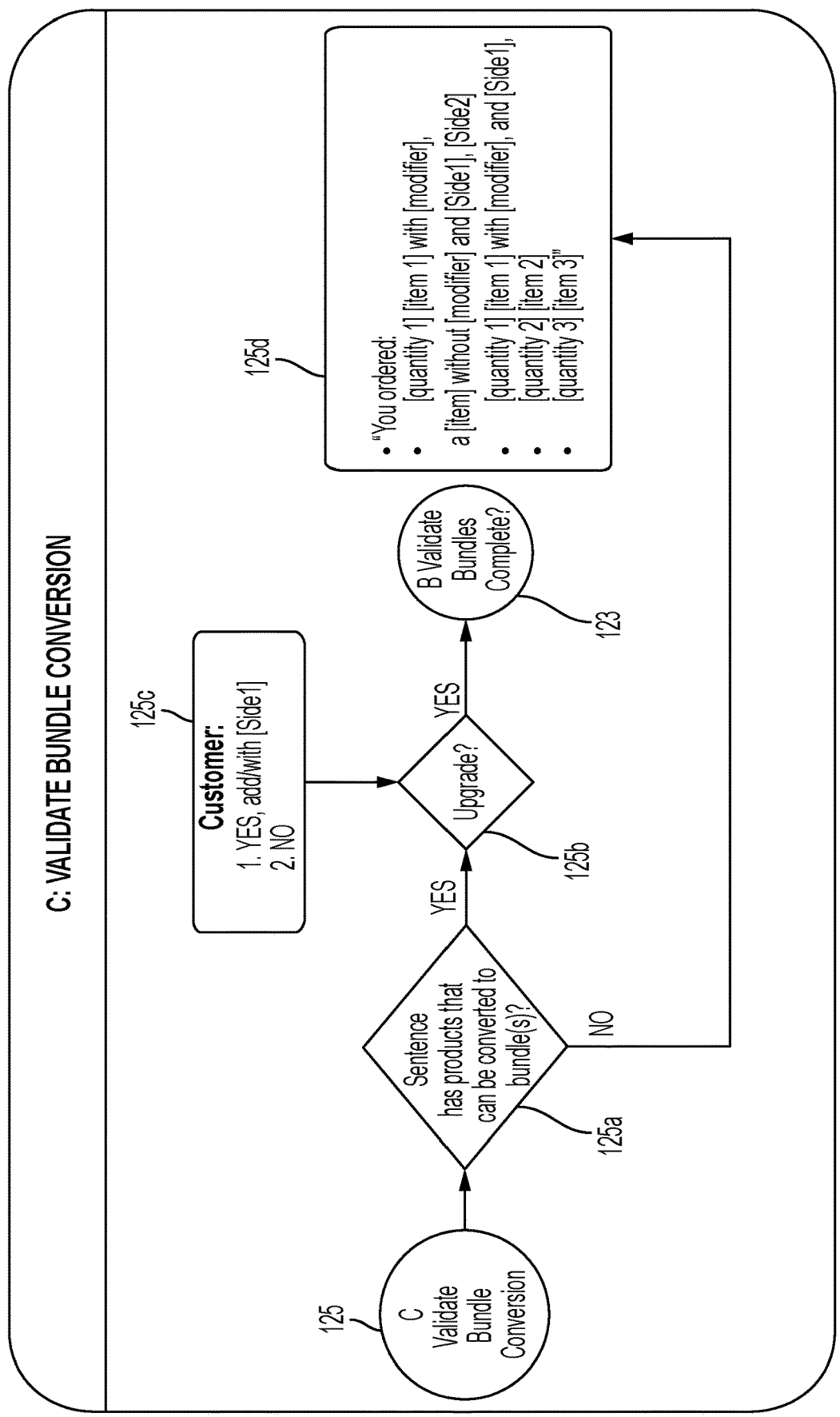
FIG. 8 is a process diagram according to an exemplary embodiment.

FIG. 8 is a process diagram according to an exemplary embodiment. The process shown in FIG. 8 is an optional subroutine of process S100 and relates to validation of item combinations ("bundles") (S125) and conversion of ordered items to bundles. For example, initially, the voice recognition system 125 determines whether the customer's utterances have items that can be converted to a bundle (S125a). If not, then the process proceeds to a final order confirmation (S125d). If the customer's order does have products convertible to one or more bundles, the assistant then prompts the customer 101 with an option to upgrade. For example, the assistant may ask the customer "Would you like to upgrade your [product] to a bundle with a side and a drink for $2.99?" (S125b). The customer may respond, e.g., by adding an item or declining to upgrade (S125c).

Figure 9:
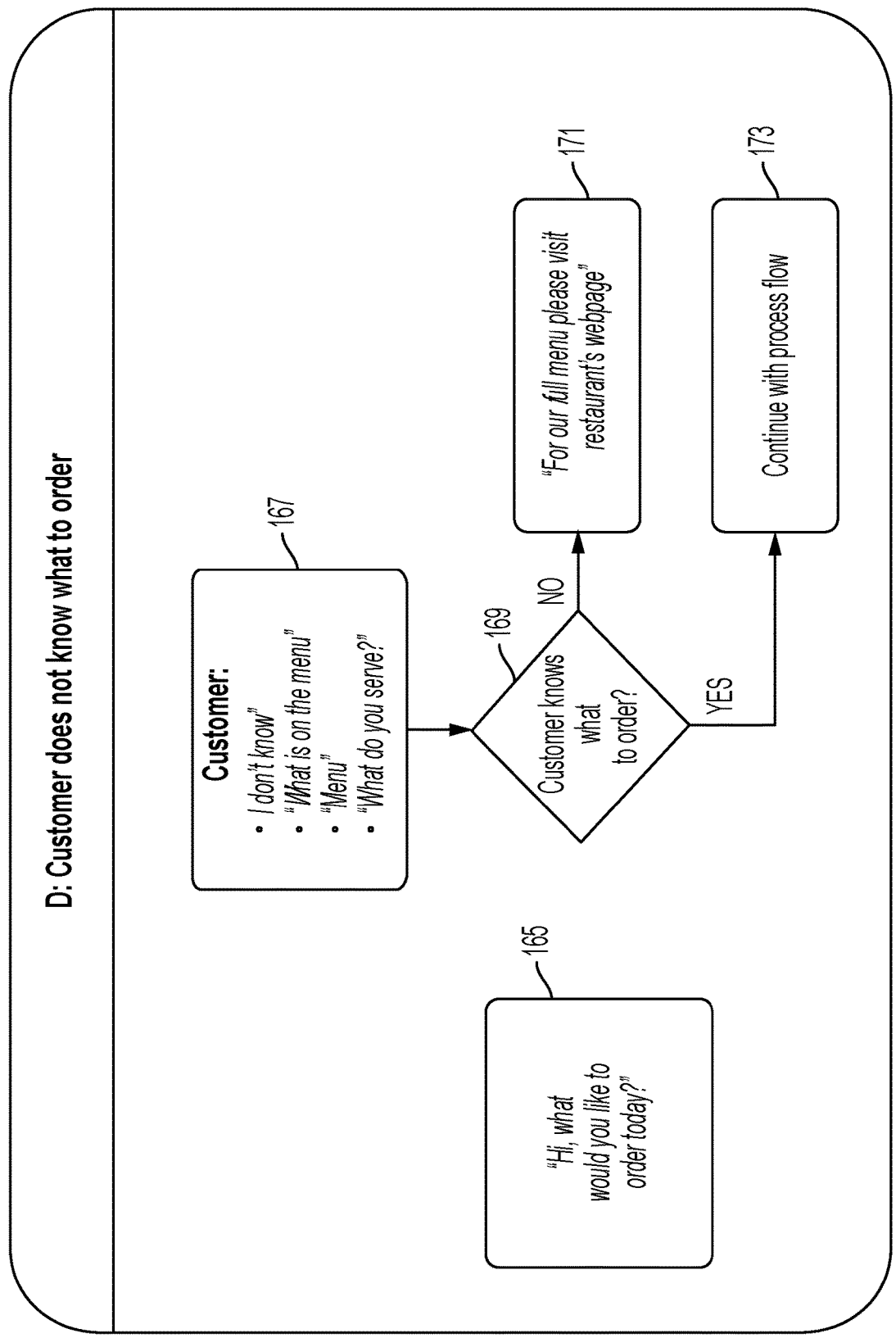
FIG. 9 is a process diagram according to an exemplary embodiment.

FIG. 9 is a process diagram according to an exemplary embodiment which is an optional subroutine of process S100. The process shown in FIG. 9 relates to a situation where the customer 101 is unsure what to order. For example, after calling a voice ordering system offered by a store 109, in response to being asked what the customer 101 would like to order (S165), the customer may indicate that the customer 101 is unfamiliar with the menu or unclear what to order (S167). The voice recognition system 125 determines whether the customer 101 has expressed an intent of what entity or entities to order (S169). If the customer 101 has not expressed such intent, then the assistant advises the customer 101 to consult the full menu of the store 109 and may provide website information, for example (S171). On the other hand, if the customer's intention is evinced, then the order processing continues (S173).

Figure 10:
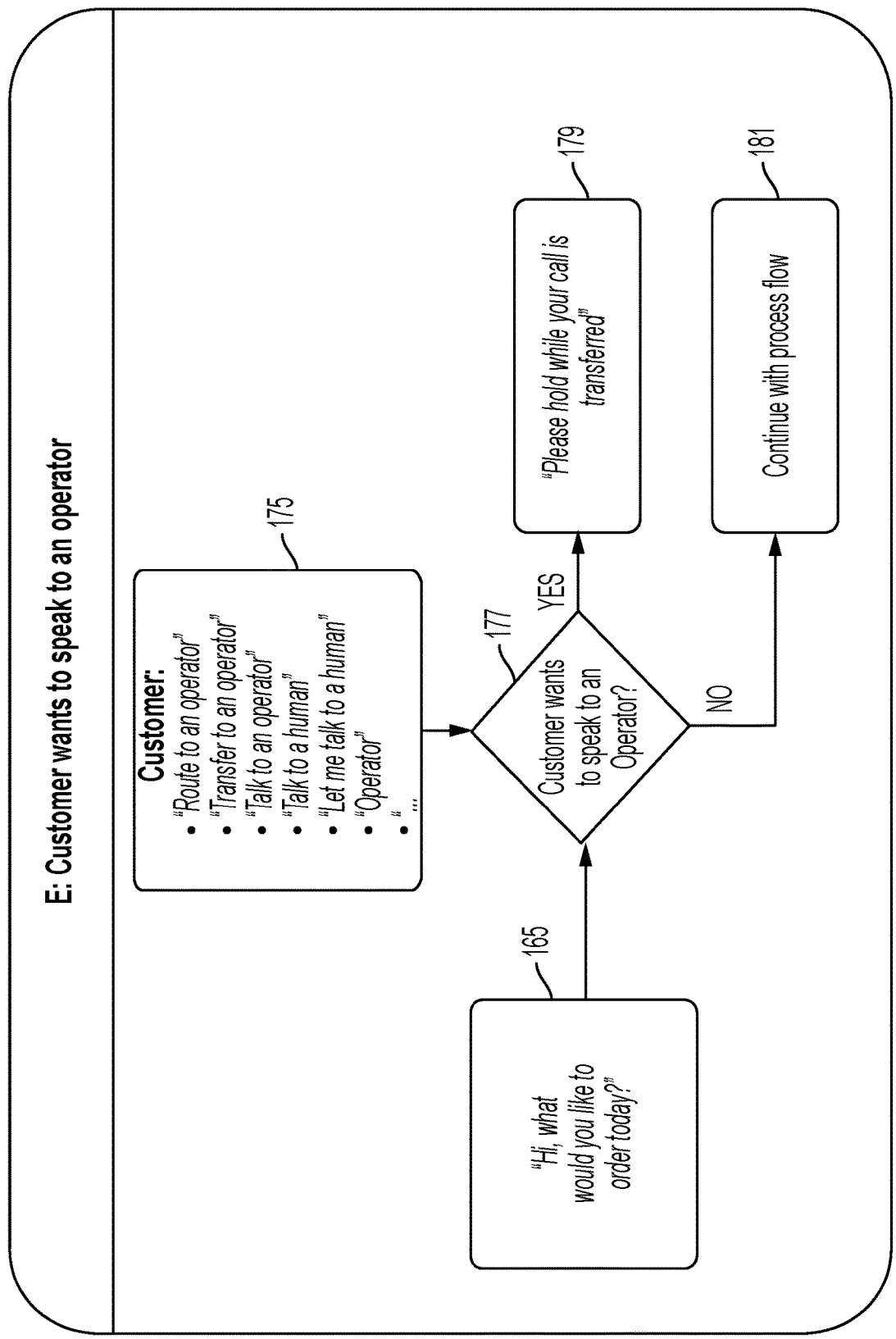
FIG. 10 is a process diagram according to an exemplary embodiment.

FIG. 10 is a process diagram according to an exemplary embodiment which is an optional subroutine of process S100. It is expected that certain customers may decline to engage with voice API 113 after being greeted and may insist on speaking to a human operator. For example, after a greeting (S165), the customer may then make utterance(s) reflecting an intention to communicate with a human operator, e.g., by asking to be routed to an operator, or saying "let me talk to a human," or the like (S175). The voice recognition system 125 then determines whether the customer's intention is to speak to an operator (S177). If the voice recognition system 125 determines an intention to speak to an operator, the system 125 then may place the customer 101 on hold and route/transfer the call to an operator (S179). On the other hand, if an intention to speak to an operator is not determined, the process proceeds with ordering using the voice API 113 and assistant as described above (S181).

Figure 11:
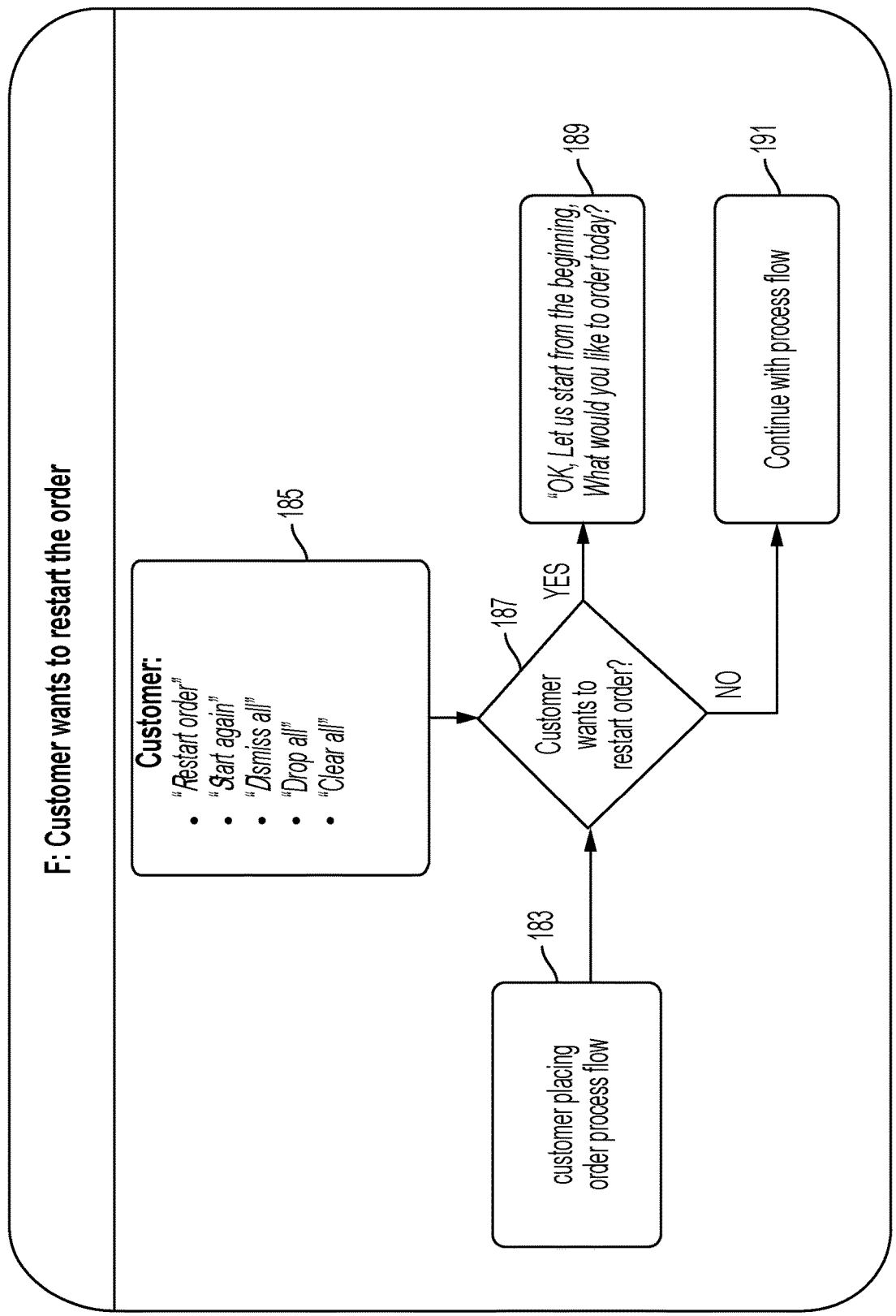
FIG. 11 is a process diagram according to an exemplary embodiment.

FIG. 11 is a process diagram according to an exemplary embodiment which is an optional subroutine of process S100. In some cases, the customer 101 may desire at some point during interaction with the assistant provided through the voice API 113 to restart the order. For example, a customer may be at an intermediate point (S183) in order processing, e.g., after upgrading an item but before a final order confirmation is received. The customer 101 makes an utterance(s) reflecting an intention to restart or cancel the existing order (S185). The voice recognition system 125 then determines whether the customer wishes to restart the order (S187). If the voice recognition system 125 determines an intent to restart the order, then the assistant provides a restart prompt, asking, for example "Let us start from the beginning, what would you like to order today?" (S189). On the other hand, if no intention to restart is determined, the process continues (S191).

Ranking for Order Processing

In at least one embodiment, multiple voice recognition engines may be provided to utilize data collected during the customer's interaction with the voice API 113 for order processing. For example, in some embodiments, a first voice recognition engine 1 ("Engine 1" or "Processor 1") is a system (a first voice recognition processor) with medium transcription quality, low NLP quality, and with multiple-entity recognition capability. A second voice recognition engine ("Engine 2" or "Processor 2") is a system (a second voice recognition processor) with low transcription quality, high NLP quality, and with only single-entity recognition capability. Transcription quality may be evaluated based on a level of agreement (correspondence) between first and second engines and based on whether enough information has been transcribed in order for the voice recognition system 125 to take action based on the conveyed menu items to be ordered and intentions expressed by the customer 101.

In particular, quality may be assessed in terms of particular language processing features associated with natural language processing services, such as whether multiple intentions may be ascertained or whether multiple items may be added to an order if a response from the engine indicates that multiple entities were identified. In some embodiments, the quality of transcription may be determined based on historical data, e.g., aggregated data of complete, correct, incomplete and incorrect orders. A category, e.g., 'low quality transcription,' 'medium quality transcription' or 'high quality transcription' may be assigned to a particular engine based on the historical data and the category designation may be re-evaluated periodically.

In particular, 'low quality' may be a designation for a transcription score in a lowest or second-to-lowest quartile of scores, a 'medium quality' may be a designation for a third-to-lowest (second-to-highest) quartile of scores, and 'high quality' may be a designation for the upper quartile of scores, where the scores are based on one or more of (1) an evaluation of a natural language processing result to determine accuracy of the natural language processing, (2) an evaluation of a transcript to determine accuracy of the transcript or (3) an evaluation of entities indicated to be uttered by the customer 101 as reported based on the natural language processing, and in comparison to the entities recorded in the transcript.

In at least one embodiment, audio data is processed by each engine independently and the responses from them are compared to each other. The responses are evaluated against several criteria, in order to decide which engine has returned a more correct response with regard to the problem space (e.g., a particular part of the conversation 105). In some embodiments, satisfaction of a first criterion for engine selection halts execution of the evaluation of further criteria. In particular, a score based on a first criterion may be used as the selection criterion.

For example, in at least one embodiment, if the first engine does not return an NLP intent, then the result from the second engine is selected. On the other hand, if the second engine does not return an NLP intent, the result from the first engine is selected. If the NLP intent identifiers from both systems do not match, the result from the second engine is selected. Further, if the first engine has detected multiple entities of the same entity identifier, the result from the first engine is selected. If the first engine has detected an intent with a quantity entity, and the second engine has detected a quantity above a threshold (e.g., more than 10 entities), the result from the first engine is selected. A final comparison compares the total count of entities returned from both engines. The result from the engine with the highest entity count is selected.

Accordingly, in some embodiments, the performance of a first voice recognition engine and a second voice recognition engine may be ranked according to the techniques described above. In some embodiments, an engine may also be referred to as a processor, and may be implemented as a microprocessor with an application specific integrated circuit (ASIC), one or more field programmable gate arrays (FPGAs), a group of processing components, or other suitable processing components. The processor is configured to execute computer code or instructions stored in memory or received from other computer readable media (e.g., a network storage, a remote server, cloud computing network system 121, etc.).

Figure 12:
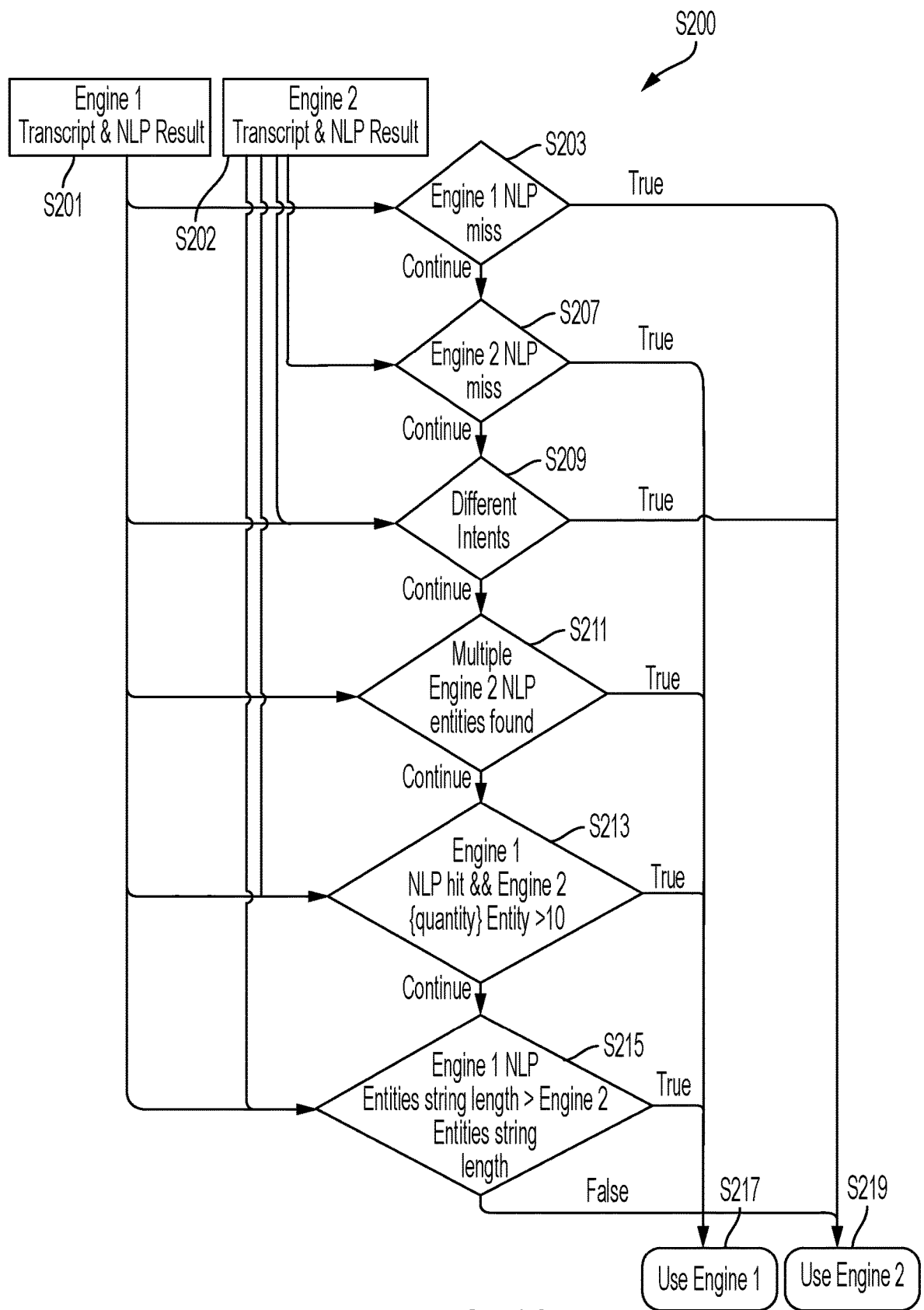
FIG. 12 is a process diagram according to an exemplary embodiment.

FIG. 12 is a process diagram according to an exemplary embodiment. The process S200 shown in FIG. 12 is an exemplary technique for determining the most favorable result from two voice recognition and natural language processing (NLP) systems with differing capabilities and qualities. As shown in FIG. 12, for example, the voice recognition system 125 receives inputs such as a transcript and a natural language processing result from the first engine (S201) and receives inputs such as a transcript and a natural language processing result from the second engine (S202). In some embodiments, the NLP systems may incorporate commercially available NLP technologies such as Dialogflow voice and NLP APIs provided by Alphabet Inc. of Mountain View, CA or the Amazon Lex NLP APIs provided by Amazon, Inc. of Seattle, WA. In some embodiments, the NLP systems (NLP processors or NLP APIs) may be from a same provider or different provider, or from combinations of providers.

According to process S200 shown in FIG. 12, a voice recognition system 125 receives inputs such as a transcript and a natural language processing result from the first engine (S201) and receives inputs such as a transcript and a natural language processing result from the second engine (S202). The voice recognition system 125 is configured to receive inputs from each engine including a transcript and a result of natural language processing. The input may include information including an indication associated with the natural language processing. The transcript may be provided in a variety of formats, e.g. JavaScript Object Notation (JSON) format, plaintext, etc.

The transcript may include, for example, menu items (e.g., specific food and drink items for order) and intentions (e.g., add, remove, modify, also referred to as 'intents'). In some embodiments, the transcript may be provided in plain text format and/or in JSON format, for example. Further, in some embodiments, the indication reflects one or more intentions of the customer 101 expressed during the interaction with the voice API 113. In some embodiments, an indication may be an intention of the customer to make an order or re-start an order. The first engine may output a first indication and the second engine may output a second indication.

The selection of an engine may be based on 'hits' and/or 'misses' from prior orders or a current order. When the first engine does not provide a first indication associated with first language processing, such as a first intention, (S203—Miss), the process S200 continues to selection of the result from the second engine (S219). A 'miss' represents a failure to provide a first indication, whereas a 'hit' represents an output of the first indication. On the other hand, when the first engine provides a first indication associated with the first language processing, a determination is then made as to whether the second engine fails to provide a second indication associated with second language processing, such as a second intention (S207—Miss). When the second engine does not provide a second indication associated with the second language processing, the process S200 continues with the selection of the result of the first engine (S217). In some embodiments, the comparison is made between an intent identifier of the first engine and an intent identifier of the second engine. An intent may be expressed as a stated desire to add ketchup to a hot dog, for example.

When both the results of the first language processing from the first engine and the second language processing from the second language are accessible and include first and second indications, the process S200 further entails comparing the respective indications. Specifically, the process S200 includes determining whether the first indication (e.g., of a first intention) differs from the second intention (e.g., of the second intention) (S209). The comparison is performed based on a text evaluation of entities and intents determined from the indications. The entity may refer to either the menu item itself (e.g., an ice cream cone) or a modifier (a topping), in some embodiments. When a discrepancy is identified between the first indication and the second indication, the process S200 continues with the selection of the second engine (S219). The second engine may have a preferable (more accurate) result due to being 'trained' on a particular menu or series of menus for a given eatery or chain of eateries where the first engine was not employed or was employed less frequently.

On the other hand, when no discrepancy is found between the first indication and the second indication, the process S200 proceeds to an analysis step, where the result from the second engine is analyzed to determine whether multiple entities are identified, or whether, in contrast, a single entity is identified (S211). The transcription provides an array of ordered entities and a plain text output that can be searched by the voice recognition system 125 to determine whether multiple entities are present in a given order or part of an order. Accordingly, the voice recognition system 125 may discern whether audio data or a portion thereof relate to a single entity or multiple entities. The number of entities identified during natural language processing of an order is expected to correlate to an order of greater complexity. When multiple entities are identified from the result of the first engine, the process S200 proceeds to the selection of the result of the first engine (S217). In particular, when the first engine detects multiple entities having a same identifier, the process S200 uses the result from the first engine (S217).

On the other hand, when the result of the first language processing by the first engine does not reveal multiple entities, the process continues with a determination of whether the first engine has detected an intention relating an entity quantity (such as an intention to order various quantities of different items). When the intent relating to the entity quantity is determined by the first engine, the process S200 involves determining whether the second engine has detected a quantity greater than a threshold quantity (e.g., a quantity greater than 10) (S213). For example, an intent associated with a particular quantity may be expressed by a customer 101 communicating an intent to order ten chili hot dogs (ten of a similarly configured item, a chili hot dog).

A customer 101 may, for example, order both multiple instances of a similarly configured item and one or more modified items, e.g., by communicating "ten chili hot dogs and also two chili hot dogs without mustard." The "two chili hot dogs without mustard" would be interpreted as a multi-intent item with modifications, and processed by the voice recognition system 125 as "2X(add_item, remove_modifier)" in at least one embodiment. If the quantity detected by the second engine exceeds the threshold, then the result of the first engine is selected (S217). Accordingly, such embodiments utilize the engine 315, 317 so as to allow for selection of the engine whose result is more accurate for a given menu.

Further, following determination of the quantities of entities identified by each of the first and second engines, a final comparison is performed (S215). Specifically, a total count of entities identified by the first engine is compared to a total count of entities identified by the second engine. When the first engine detects a greater number of entities than the second engine, the result from the first engine is selected (S217); conversely, when the second engine detects a greater number of entities than the first engine, the result of the second engine is selected (S219).

In some embodiments, the historical data and learning of one engine may provide a quantifiable higher rate of accuracy compared to another engine. For example, a result or results from one or more prior orders may be used in selecting a processor for a current order. For example, where one engine is trained on a menu for a particular type of cuisine—such as a menu with a high percentage of foreign language items—that engine may produce better results than an engine trained primarily on menus for other types of cuisines. Further, in some embodiments, the NLP processor may be evaluated to determine performance for a specific cuisine type for one eatery based on performance results for a same or different eatery serving similar or the same cuisine type.

The first and second voice recognition engines are described above in relation to FIG. 12 as examples in their broadest forms and the techniques of the present disclosure are not limited to use of two voice recognition engines. In particular, in some embodiments, a different engine may be used, and/or the selection of a result from one of a plurality of engines may be based on one or more criteria.

System Architecture for Order Processing

Figure 13:
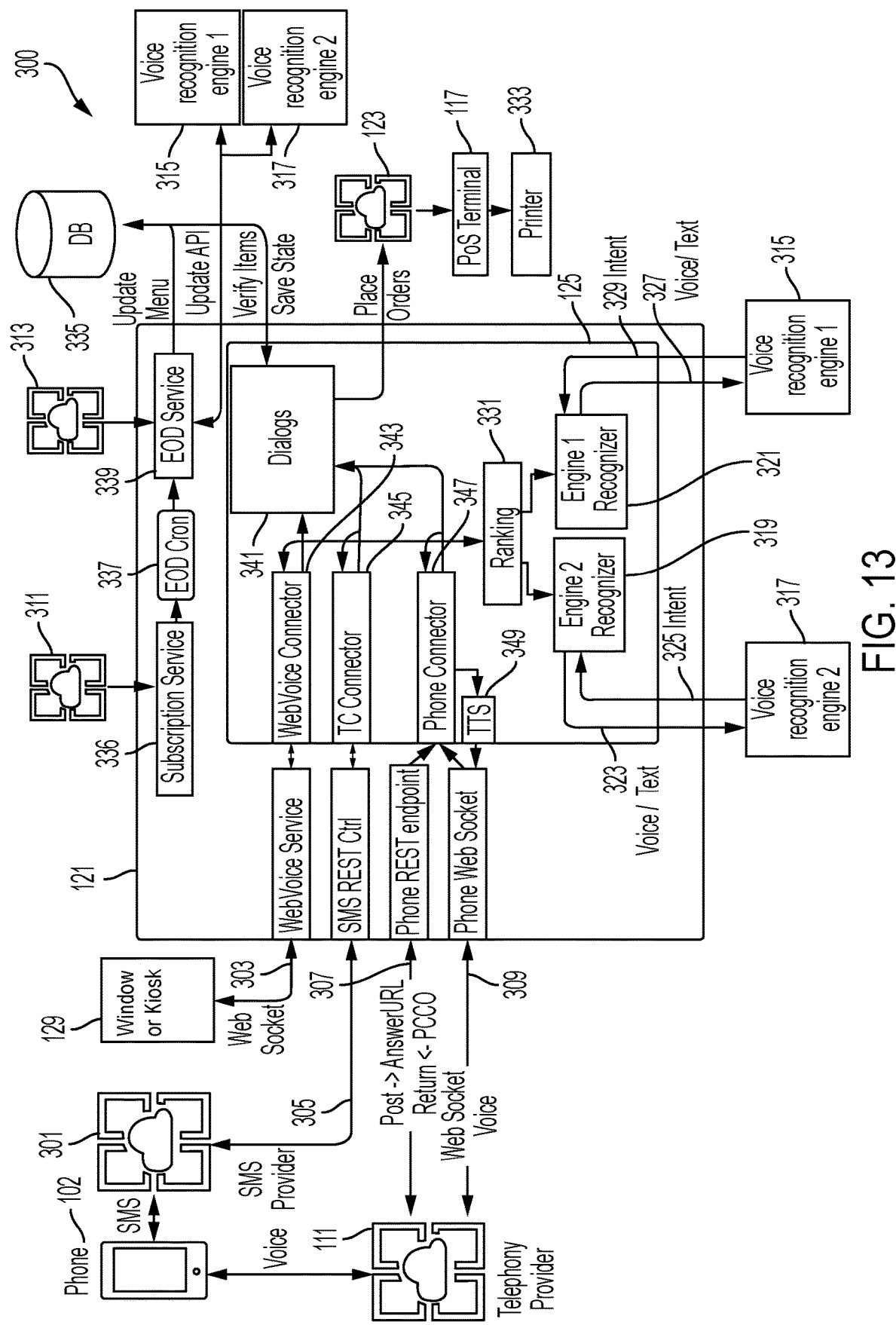
FIG. 13 is a schematic diagram of a system according to an exemplary embodiment.

FIG. 13 is a schematic diagram of a system according to an exemplary embodiment. The system 300 shown in FIG. 13 may be implemented for a drive-through eatery, an eatery without a drive-through, a sit-down eatery, a take-out only eatery, a self-service kiosk, or at other merchants. The system 300 includes a telephone 102 (e.g., a mobile phone, a landline phone, or a VoIP interface). The telephone 102 is configured to communicate with an SMS provider 301. The SMS provider 301 may have a cloud computing network through which communication with the telephone 102 and/or the cloud computing network system 121 takes place. The telephone 102 is further configured to communicate with telephony provider 111. The telephony provider 111 is configured to communicate voice information (e.g., audio data) to a telephone web socket 309 of the cloud computing network system 121. The telephony provider 111 is further configured to receive information from the telephone web socket 309 (e.g., a web socket API using the IETF RFC 6455 duplex communication protocol). The telephony provider 111 is further configured to communicate with a telephone REST protocol endpoint 307 of the cloud computing network system 121.

In particular, in at least one embodiment, telephony provider 111 receives call 103 and notifies the voice recognition system 125 via a pre-configured automated message (e.g., via a webhook URL, such as 'AnswerURL' shown in FIG. 13). Upon receiving notification of the call 103, the voice recognition system 125 generates a response (e.g., a provider call control object PCCO), which may include a unique URL for the telephony provider 111 to create a web socket connection back to the voice recognition system 125. The telephony provider 111 may then open the connection to the unique URL and associate the call 103 (e.g., a live phone call) with the original notification from the telephony provider 111. These processes may be performed at the beginning of the interaction of the customer 101 with the voice recognition system 125 to facilitate communication and collection of audio data via the connection through telephone web socket 309.

The SMS provider 301 is configured to communicate with an SMS REST protocol control module 305 of the cloud computing network system 121. The SMS REST control protocol 305 is configured to communicate with a text-chat (TC) connector module 345 of the voice recognition system 125, which is configured to communicate with an SMS service. The TC connector module 345 is configured to communicate with an NLP evaluator module 331. The NLP evaluator module 331 is configured to analyze NLP processed information (e.g., the transcript and the result of NLP) according to ranking criteria as discussed above in connection with FIG. 12.

For example, the NLP evaluator module 331 selects a result of natural language processing from a first voice recognition engine 315 or a second voice recognition engine 317. The voice recognition engines 315, 317 may simultaneously receive audio data for processing according to some embodiments. In some embodiments, the NLP evaluator module 331 performs evaluation of a plurality of commercially available NLP APIs and perform evaluation not only on the basis of performance for a given NLP result but on the basis of historical transcription accuracy, time to completion, and other factors. For example, a historical transcription record indicating that a particular NLP approach has a historical accuracy above a predetermined threshold (e.g., an accuracy level of 70%-90% over six months of past orders) may receive a historical transcription score which the NLP evaluator module 331 can use as an evaluation criterion.

The first voice recognition engine 315 has a first recognizer module 321 and the second voice recognition engine 317 has a second recognizer module 319. Voice and/or text data 327 is supplied from the first recognizer module 321 to the first voice recognition engine 315, and voice and/or text data 327 is supplied from the second recognizer module 319 to the second voice recognition engine 317. In some embodiments, the recognizer modules 319, 321 may be implemented as direct plug-ins to the voice recognition engines 315, 317. For example, a plug-in including commercially available language processing features and/or API components may be incorporate such features for processing the inputs to the voice recognition system 125. The NLP evaluator module 331 may then use homogenized responses from the voice recognition engines 115, 117 to determine which engine provides a more accurate response. One or more detected first intentions 329 from at least one customer 101 are supplied from the first voice recognition engine 315 to the first recognizer module 321, and one or more detected second intentions 325 from at least one customer 101 are supplied from the second voice recognition engine 317 to the second recognizer module 319.

The store 109, drive-through 129 or self-service kiosk is configured to communicate with an Internet-based voice service 303 via a web socket. The Internet-based voice service 303 is configured to communicate with an Internet-based voice connector module 343 of the voice recognition system 125. The Internet-based voice connector module 343 of the voice recognition system 125 is configured to communicate with the NLP evaluator module 331. The Internet-based voice connector module 343 is configured to transmit information to a dialog module 341 which processes select aspects of the interaction of the customer 101 with the voice API 113, including addition or removal of an item during ordering, for example.

Further, the telephone REST protocol endpoint module 307 and the telephone web socket 309 are both configured to communicate with a telephone connector module 347. The telephone connector module 347 is configured to communicate with the NLP evaluator module 331, e.g., to transmit audio data directly to the evaluator module 331. The telephone connector module 347 is additionally configured to transmit information to a text-to-speech module 349, which in turn may transmit information back to the telephone web socket 309. Further, the telephone connector module 347 is configured to transmit information to the dialog module 341. The dialog module 341 is configured to transmit orders for order placement to the order submission API 123, which may be implemented in the cloud computing network system 121 or another cloud-based system. The order submission API 123 is configured to then transmit the placed order to the PoS terminal 117, which may output order information to a printer 333 in the store 109.

The dialog module 341 may be configured to assign a specific stack identifier to dialog data, so that a plurality of dialog sessions are each associated with their own stack. The dialog module 341 may maintain a prior stack associated with first dialog occurring prior to second, subsequent dialog to maintain process continuity and have the dialog readily accessible for processing if the input from the customer 101 relates to an earlier part of the process. For example, after a menu inquiry session in which the customer 101 asks for a description of various menu items during a first dialog, the customer may then select a menu item for ordering during a second item. In response to the voice API 113 asking the customer 101 "what else can I get you?," if the customer 101 then asks "what is a coffee?", the voice recognition system 125 is configured to return to the first dialog with queries about particular items and their descriptions.

The cloud computing network system 121 may, in some embodiments, include a subscription service module 336. The subscription service module 336 acts as a manager to regulate access from one or more stores 109 or franchises to the cloud computing network system 121 and selected resources thereof, including the voice recognition system 125. The subscription service module 336 is configured to receive information from a portal API 311. The subscription service module 336 is configured to regularly check portal API 311 for new customer subscriptions (e.g., new subscribers to the service providing access to at least the voice recognition system 125). When new subscriptions are found, a new 'job' or task is created in the voice recognition system 125 to import information relating to the new subscription at predetermined intervals, e.g., daily.

In some embodiments, the portal API 311 provides a content management system that may be managed by the subscription service. The portal API 311 manages permissions and subscriptions of subscribers to products offered by the subscription service. In some embodiments, the portal API 311 generates data relating to one or more subscribers, and the data is used by the voice recognition system 125. The portal API 311 may be implemented in the cloud computing network system 121 or another cloud-based system.

The cloud computing network system 121 may, in some embodiments, be configured such that the subscription service module 336 is communicated with an end-of-day (EoD) chronological processing module 337, also referred to as an EoD module. The EoD module 337 is configured to receive subscription service data communicated from the subscription module 336 and process the data based on chronological intervals, for example, by determining how subscription information has changed by the end of a business day. The EoD module 337 in turn is communicated with an EoD service module 339. The EoD service module 339 may be utilized to update the voice recognition system 125 by supplying data to train the voice recognition engines 315, 317.

Additionally, in some embodiments, the EoD service module 339 is further configured to receive information from the EoD module 337 and to import customer data from a data management API 313. Such importations may be performed on a daily basis, as defined by the end-of-day configuration property for subscribers, or at another predetermined timing interval. The data management API 313 may be implemented in cloud computing network system 121 or another cloud-based system. In some embodiments, the data management API 313 includes a content management system which is utilizable to configure client company settings (where the clients may include subscribers, such as individual stores, groups of stores, or other business entities) and other information pertaining to the operation of those stores and/or groups of stores. Data from the data management API 313 is consumed by and utilized by the voice recognition system 125, including for enhancement of order processing.

Further, in some embodiments, the information from the EoD service module 339 may be transmitted to a database 335 for the subscriber service. The database 335 may receive information relating to updates to menu items from new subscribers identified by the subscription service module 336 and/or updates from existing subscribers. The database 335 is configured to output subscriber and/or order data to the dialog module 341 and to receive information from the dialog module 341. The database 335 is configured to verify items referred to in the dialog module 341 and to save a state when the items are referenced. Further, historical NLP score data may be stored in the database 335.

The database 335 is further configured to store information including, but not limited to, subscriber information such as subscriber attributes at the end of the day or site information associated with a store 109, a drive-through eatery, or a kiosk, for example. Each store, drive-through or kiosk may be assigned a site identification, to aid in tracking and to account for differences in menu items locally and regionally, for example. The database 335 may further store information relating to a state of one or more sites at the end of the day or a particular points for one or more time zones, information relating to different telephones or telephone services offered at one or more sites, compiled menus from the data management API 313, and/or conversation state information from the interaction between the customer 101 and the voice API 113.

Real-Time Multi-Speaker Recognition and Intent Detection

In at least one embodiment, one or more processors may utilize machine learning techniques. For example, the first and second engines for natural language processing may be trained using a database of historical order transcripts. Moreover, a result of processing from one engine may be used to train another engine. Further, machine learning may be used to customize voice recognition for groups of customers or individual customers.

Figure 14A:
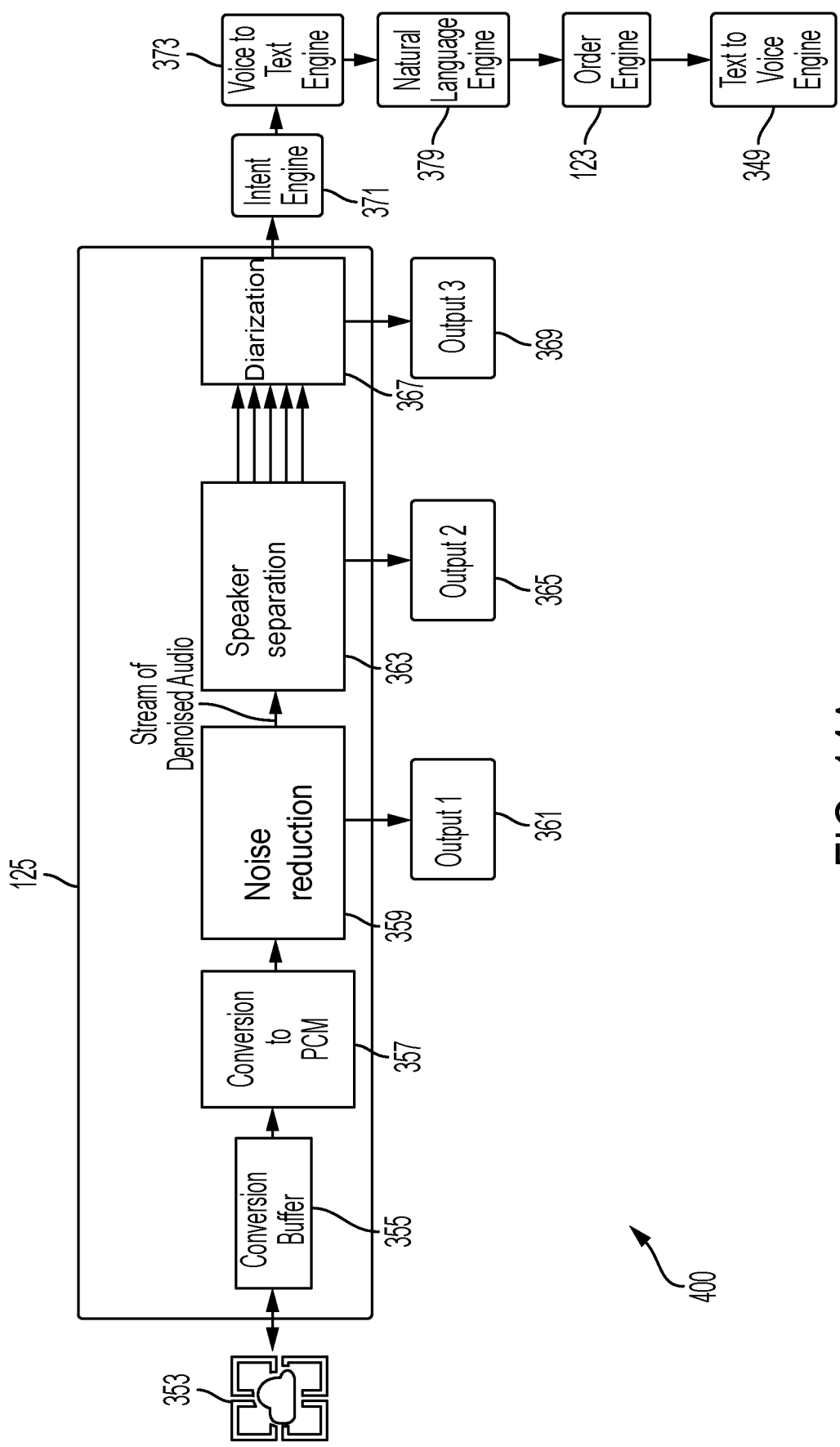
FIG. 14A is a schematic diagram of a system and/or subsystem according to an exemplary embodiment.

FIG. 14A is a schematic diagram of a system according to an exemplary embodiment. A system 400 shown in FIG. 14A may use the cloud computing network system 121 together with an Internet gateway 353. The Internet gateway 353 may facilitate HTTP and/or audio streaming using a Real Time Streaming Protocol (RTSP) with internal system audio files and/or streams, although other streams in and/or out may be implemented. The system 400 is accordingly configured to provide, either in an offline or an online mode, a streaming natural language processing resource via one or more audio signal input interfaces (e.g., with a static file, the Internet, or Bluetooth). Although the system 400 is depicted in conjunction with the cloud computing network system 121, it should be appreciated that in some embodiments, all or part of the activities performed via the cloud may be conducted within a local network (e.g., a local network at a particular store 109 or a group of stores, such as at a food court).

The streaming capability allows for taking an audio signal (expected to contain speech from a single human speaker or multiple speakers) and provide original, separated and/or associated metadata to describe individual customer intents. The original data may include data from a plurality of individuals whose utterances are captured chronologically. The data may be spliced to indicate what each individual has uttered in order, regardless of when any particular individual was speaking and without regard to the progression of the overall conversation. Accordingly, the metadata may be linked to individual speakers.

Additionally, in some embodiments, an overall streaming framework may be employed, with additional APIs serving as optional "plug-in" interfaces providing additional capabilities through the cloud computing network system 121. Such plug-in interfaces may include, for example, a plug-in module 359 for real-time recurrent neural network de-noising which is configured to provide a first output 361, a plug-in module 363 for deep learning real-time separation of speakers among multiple speakers, where the plug-in module 363 is configured to provide a second output 365, and a plug-in module 367 for real-time or near real-time speaker diarization, which is configured to provide a third output 369.

Noise Reduction

In at least one embodiment, the voice recognition system 125 may include a conversion utility that contains a conversion buffer 355 with a plug-in interface. The interface serves to transmit audio data to a noise-reduction interface, such as the plug-in module 359, which then returns de-noised audio to the conversion utility. The noise reduction ("de-noising") may be performed for a variety of audio formats or input container formats. Conversion may be performed of container formats and/or audio formats to a pulse code modulation (PCM) format by a PCM conversion module 357.

In some embodiments, the PCM conversion module 357 communicates the converted data to the plug-in module 359 for de-noising. Further, in some embodiments, a staged approach to the conversion utility may be implemented with a plurality of real-time interfaces combined to provide a full pipeline, so that "de-noised" audio data is provided in real-time or with a delay (e.g., a delay in the order of a range of milliseconds or seconds, such as between 2-5 seconds) from the raw audio data. In particular, a method according to at least one embodiment includes determining whether a relatively clear response can be elicited from the audio data following de-noising. If the voice recognition system 125 determines that a clear response is unlikely to or cannot be obtained, a corrective action may be taken (e.g., further de-noising processing and/or routing to a human operator), which corrective action may take place after a delay. Under such a staged approach, the overall order interaction time may take longer, while the customer experience is expected not to decline due to inaccurate order processing. In some embodiments, the de-noising may occur in near-real time, so as to be carried out while one or more speakers or sources of sound is continuing to generate audio data.

In at least one embodiment, the voice recognition system 125 utilizes a recurrent neural network, e.g., via plug-in module 359, to process the audio data collected during the interaction between the customer 101 and the voice API 113. In at least one embodiment, the audio data may be processed to extract voice signals. It is expected that the audio data has an amount of noise, such as background music, crowd noise, engine noise, radio static, etc., and other signals often mixed in with voice signals. In at least one embodiment, the audio processing includes reducing or eliminating such noise or signals, including by separating the "noisy" part of the data from a remainder. For example, the internal outputs of the plug-in module 359 may include noise 359a and "clean" voice data such as de-noised audio data 359b. The noise reduction, in some embodiments, may be performed without regard to the number of speakers or whether the audio data is received when the user is using a mobile device, a landline phone, or at a drive-through, for example.

Multi-Voice Separation and Voice Recognition Processing

Figure 14B:
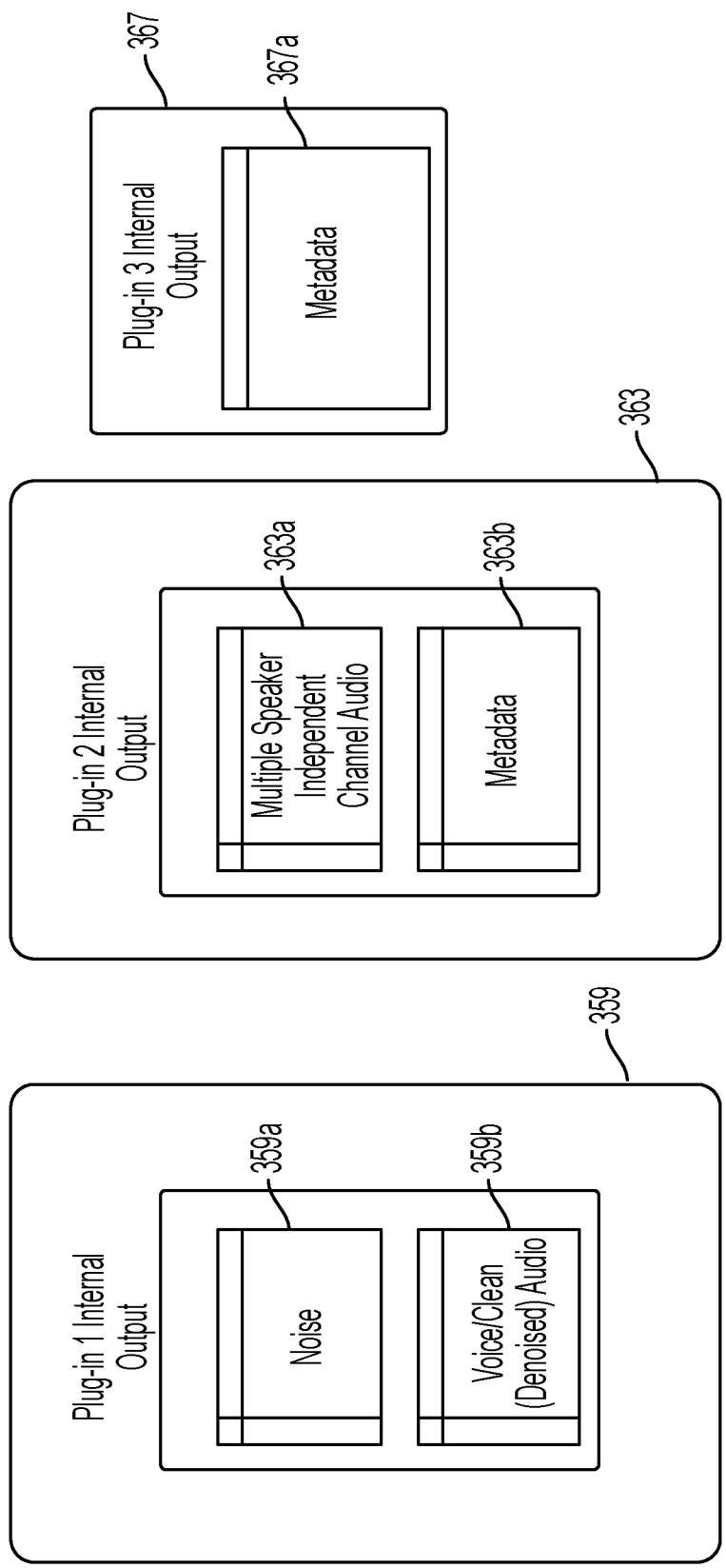
FIG. 14B is a schematic diagram of a system and/or subsystem according to an exemplary embodiment.

As shown in FIG. 14B, in some embodiments, voice recognition processing by the voice recognition engine 125 may employ one or more plug-in modules. For example, the voice recognition processing may employ deep learning techniques, e.g., a deep attractor network, as implemented in the plug-in module 363, which is configured to receive a stream of de-noised audio data from the plug-in module 359. A deep attractor network allows for separating multiple sound sources (e.g., speakers) from a single channel audio signal into the component parts. The deep attractor network approach involves creating attractor points in high dimensional embedding space of the acoustic signals which use time-frequency bins corresponding to each source. The sources are analyzed in the embedding space to determine the similarity of each bin to the source. The plug-in module 363 has internal outputs including multiple-speaker independent channel audio 363a and metadata 363b, such as metadata relating to a timing and/or length of each of a plurality of audio segments.

Streaming or online deep attractor network implementations allow for real-time or nearly real-time multi-voice separation and recognition. In at least one embodiment, an intermediate format of the source separation data includes fast Fourier transform data in the form of an image that is "recognized" by voice recognition system 125, interpreted, and reconstructed. In some embodiments, a sample set at a specified overlap may be used to provide a streaming interface, as decoded data may be produced faster than real-time, and a buffer may be incorporated into voice API 113. The output of the voice recognition system 125 provides independent channels for each audio stream.

In some embodiments, the buffer is provided between when the channels are separated and when transcription can be or is desired to be performed. The timing of separation and buffering may be controlled according to various implementations. For example, at the drive-through system described above, the separation may be performed after a first time following audio signal detection by microphone 137 and before a second time when the separated channel data is provided to a natural language engine 379 discussed below.

As described above, the voice recognition system 125 is configured to recognize individual speakers. The recognition of individual speakers may be implemented using an unbounded interleaved-state recurrent neural network or a long short-term memory recurrent neural network, for example.

In some embodiments, speech diarization is performed in furtherance of speech recognition of one or more speakers of the audio data in real-time or nearly in real-time. Speech diarization involves partitioning an input audio stream into segments according to the identity of the speaker(s), allowing for the voice recognition system 125 to assign an individual identity to an individual speaker. In some embodiments, the multi-channel speaker audio stream is communicated from the plug-in module 363 to the plug-in module 367 which serves as a diarization module. Automatic speech transcription may be enhanced with speech diarization by breaking up the audio stream into 'turns' by individual speaker. For one or more recognized speakers, the plug-in module 367 outputs metadata 367a relating to a timing and/or length of each of a plurality of audio segments.

Further, in some embodiments, using speech diarization, the output of the voice recognition system 125 may contain sound samples for one or more speakers. Information regarding the order in which the speakers were understood by the voice recognition system 125 may be stored in a metadata file. The plug-in module 367 is configured to output segmented audio data to an intent engine 371, which may, in turn, transmit data to a voice-to-text engine 373, natural language engine 379, the order submission API 123, and a text-to-voice engine 349.

Figure 14C:
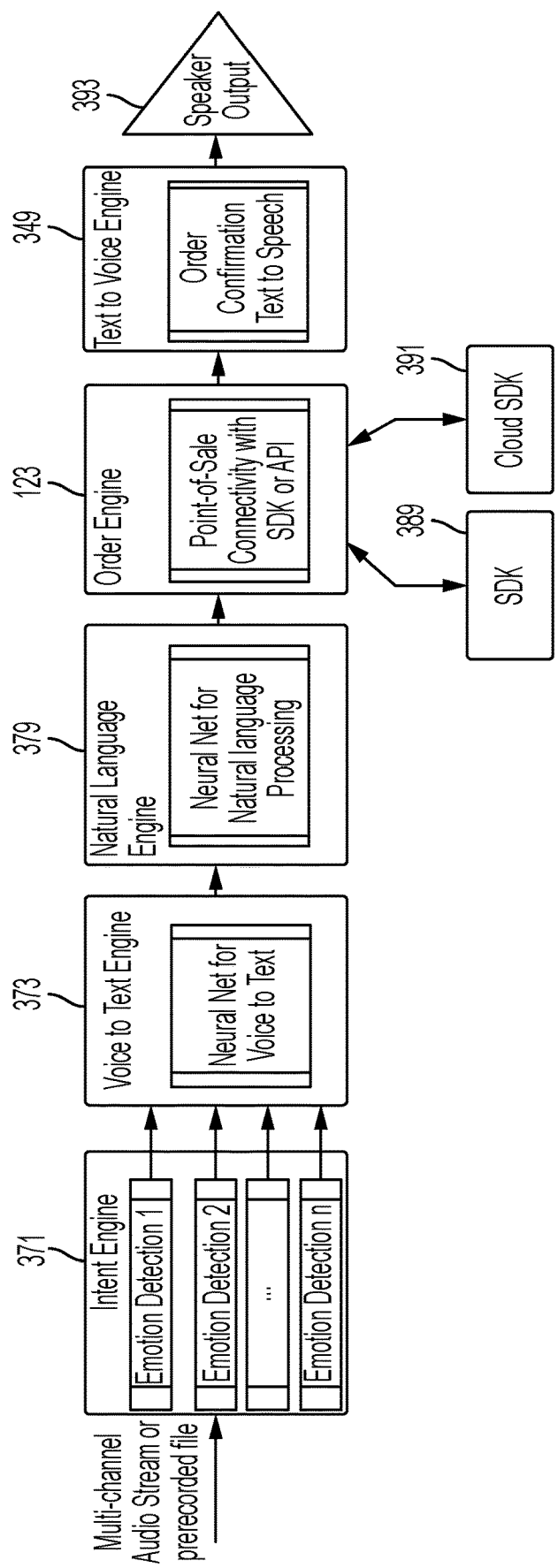
FIG. 14C is a schematic diagram of a system and/or subsystem according to an exemplary embodiment.

FIG. 14C depicts a further subsystem of system 400, according to at least one embodiment. In some embodiments, the voice recognition system 125 is configured to carry out sensing of emotions of speaker(s) based on the audio data. For example, in connection with determining whether a speaker has said "Let me speak to a human," the intent engine 371 of the voice recognition system 125 may perform emotion detection to determine that the speaker is frustrated and should be connected to a human operator. The intent engine 371 may perform a first detection 371, a second detection 371, etc., based on the multi-channel audio stream or pre-recorded file inputted to the engine 371. Further, in some embodiments, emotion sensing may be used for recognition of the response from individuals to determine which individual in a group is in charge of ordering. Such techniques may be used to determine independent orders within a group of orders.

For example, in at least one embodiment, the intent engine 371 may assess which voice out of a group of voices has been the most 'instructive,' or authoritative e.g., which voice has given a majority of order-related information. For example, a determination may be made as to which speaker out of a plurality of speakers has the highest percentage of intent-related content, and to rank identified speakers accordingly. Such a speaker would be identified as a speaker of 'authority,' e.g., a speaker in charge of ordering within a group. In some embodiments, the voice recognition system 125 may amplify the voice of the speaker identified as the speaker of authority to aid in processing. The voice recognition system 125 may use additional prompts to aid in the assessment, in an analogous fashion as to how a human operator may pose additional questions to determine conversational control and to facilitate finalizing a transaction. For example, the voice recognition system 125 may output a confirmation-related statement such as "Let me repeat your order" or "Is that all?" Moreover, the orders may be placed into the order submission API 123 in order, one at a time, by speaker.

In some embodiments, the voice-to-text 373 engine is utilized for each individual determined to have conveyed an intent, and converted to text. The voice-to-text engine 373 may receive outputs from one or more detection results by the intent engine 371. The voice-to-text engine may apply neural network models in an API that recognizes one or more languages. The voice-to-text engine may transcribe audio data from call centers or directly from the voice API 113. Further, the voice-to-text engine may process the audio data in real-time using streaming, or using pre-recorded audio. In some embodiments, the voice-to-text engine may process audio that originates from a call from one or more speakers, typically recorded at an 8 kHz-16 kHz sampling rate.

In some embodiments, the natural language engine 379 may be provided for further processing of the audio data that is converted to text and received from the voice-to-text engine 373. The natural language engine may process the text to assess probabilities of best matching of order information. For example, the natural language engine may determine a best match for one or more removals, additions or modifications of items to an order. A machine learning technique such as linear prediction with recurrent neural networks (LPCNet) may be used to convert the text obtained by the natural language engine to an audio output (a voice output) based on an internal database of responses from the voice recognition system 125. The database may be accessed through the cloud computing network system 121 and made available to one or more subscribers.

The natural language engine 379 may provide the natural language processing results to the order submission API 123 (an order engine) or to an order submission software development kit (SDK). The order submission API 123 or order submission SDK is configured to communicate with the PoS 117 to facilitate order fulfillment at the store 109, drive-through window 129, kiosk, etc. In some embodiments, the order submission API 123 may receive and/or transmit data to/from a PoS SDK 389 and/or a cloud SDK 391. The order submission API 123 may, in some embodiments, provide order information to the text-to-voice module 149, so as to facilitate an order confirmation being converted from text to speech, which can then be outputted to the customer 101 as output 393. In some embodiments, the order submission API 123 causes an output to be transmitted for order fulfillment.

System Configurations

In one embodiment, portions of the interface with the cloud-based applications may be supplied by third parties. For example, the cloud based applications may include voice to text applications, such as Amazon Voice Services supplied by Amazon Inc. of Seattle, WA, Google Voice made by Alphabet, Inc. of Mountain View, CA, Siri made by Apple, Inc. of Cupertino, CA, or Cortana made by Microsoft Corp. of Redmond, WA. Further, portions of other cloud based applications can include personal assistant applications such as Apple's Siri, and Microsoft's Cortana. In some embodiments, cloud based voice recognition applications can provide as high as 95% natural voice recognition accuracy. In other embodiments, the cloud-based applications may include a natural language processor as described above. The natural language processor may be a voice to text application, such as those described above. In other embodiments, the natural language processor may be used to processes natural language text into computer executable commands. While the natural language processor may be part of the cloud-based applications, it is considered that the natural language processor may be separate from the cloud based applications, and may be integrated into a computer system.

Additional features according to one or more embodiments are set forth below. In some embodiments, one or more systems as described herein may include a back-end server, one or more administrator devices, one or more third-party systems, or combinations thereof. The back-end server, one or more administrator devices, and one or more third-party systems may communicate via a network separate from or in addition to cloud network system 121. The network may include a local area network (LAN), wide area network (WAN), a telephone network, such as the Public Switched Telephone Network (PSTN), a wireless link, an intranet, the Internet, or combinations thereof.

A computer system according to one or more embodiments may be used to implement one or more of the processes described herein by the back-end server, the one or more administrator devices, and/or the one or more third-party systems. The processes may be implemented via instructions in code from any suitable computer programming language such as, but not limited to, C, C++, C #, Java®, JavaScript®, Perl®, HTML, XML, Python®, and/or Visual Basic®. The computing system includes a bus or other communication components for communicating information and a processor coupled to the bus for processing information. The computing system can also include one or more processors coupled to the bus for processing information. The computing system also includes memory, such as a RAM or other dynamic storage device, coupled to the bus for storing information, and instructions to be executed by the processor. The memory can also be used for storing order information, temporary variables, or other intermediate information during execution of instructions by the processor. The computing system may further include a storage device or other static storage device coupled to the bus for storing static information and instructions for the processor. In some implementations, the storage device may be a solid state device, magnetic disk or optical disk, is coupled to the bus for persistently storing information and instructions. The computing device may include, but is not limited to, digital computers, such as laptops, desktops, workstations, personal digital assistants, servers, mainframes, cellular telephones, smart phones, mobile computing devices (e.g., a notepad, e-reader, etc.) etc.

The computing system may be coupled via the bus to a display, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device, such as a keyboard including alphanumeric and other keys, may be coupled to the bus for communicating information and command selections to the processor. In some implementations, the input device may be integrated with the display, such as in a touch screen display. The input device can include a cursor control, such as a mouse, a trackball, or cursor direction keys, for communicating direction information and command selections to the processor and for controlling cursor movement on the display.

According to various implementations, the processes and/or methods described herein can be implemented by one or more computing systems in response to the processor executing an arrangement of instructions contained in memory. Such instructions can be read into the memory from another computer-readable medium, such as the storage device. Execution of the arrangement of instructions contained in the memory causes the computing system to perform the illustrative processes and/or method steps described herein. One or more processors in a multi-processing arrangement may also be employed to execute the instructions contained in the memory. In alternative implementations, hard-wired circuitry may be used in place of or in combination with software instructions to realize illustrative implementations. Thus, implementations are not limited to any specific combination of hardware circuitry and software.

The computing system also includes a communications unit that may be coupled to the bus for providing a communication link between the system and a network. As such, the communications unit enables the processor to communicate, wired or wirelessly, with other electronic systems coupled to the network. For instance, the communications unit may be coupled to an Ethernet line that connects the system to the Internet or another network. In other implementations, the communications unit may be coupled to an antenna (not shown) and provides functionality to transmit and receive information over a wireless communication interface with the network.

In various implementations, the communications unit may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communications unit may include one or more transceivers configured to communicate using different types of protocols, communication ranges, operating power requirements, RF sub-bands, information types (e.g., voice or data), use scenarios, applications, and/or the like. In various implementations, the communications unit may comprise one or more transceivers configured to support communication with local devices using any number or combination of communication standards.

In various implementations, the communications unit can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc.). The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS).

As noted above, implementations within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Certain implementations have been described in the general context of method steps which may be implemented in one implementation by a program product including machine-executable instructions, such as program code, for example in the form of program modules executed by machines in networked environments. Generally, program modules include routines, programs, objects, components, data structures, etc. that perform particular tasks or implement particular data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, implementations may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable consumer electronics, network PCs, minicomputers, mainframe computers, and so on. Implementations may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

As used herein and in the appended claims, singular articles such as "a" and "an" and "the" and similar references in the context of describing the elements (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein, is intended merely to better illuminate the implementations and does not pose a limitation on the scope of the claims unless otherwise stated. No language in the specification should be construed as indicating any non-claimed element as essential.

Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified. The expression "comprising" means "including, but not limited to." Thus, other non-mentioned components or steps may be present. Unless otherwise specified, "a" or "an" means one or more.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations.

It is to be understood that to the extent that the present disclosure refers to certain preferred implementations, various other implementations and variants may occur to those skilled in the art, which are within the scope and spirit of the disclosure, and such other implementations and variants are intended to be covered by corresponding claims. For example, one or more features may omitted from or otherwise not present in certain embodiments or may be combined from different embodiments. Those skilled in the art will readily appreciate that many modifications are possible without materially departing from the novel teachings and advantages of the subject matter described herein. For example, the order or sequence of certain process or method steps may be varied or re-sequenced according to alternative embodiments. Other substitutions, modifications, changes and omissions may also be made in the design, operation and arrangement of the various exemplary embodiments without departing from the scope of the present disclosure.

What is claimed is:

1. A system comprising:
   at least one point-of-sale (POS) terminal comprising communication circuitry to permit wireless communication with a cloud-based computing system, the at least one POS terminal configured to perform order processing of one or more menu items of a menu of an eatery;
   a processor configured to:
      receive, via an audio signal interface, audio data comprising audio of at least an order corresponding the one or more menu items of the menu;
      process the audio data to identify one or more speakers from which the audio data is produced, wherein the audio data is processed using machine learning to assign an individual identity to a speaker of the one or more speakers, wherein the processing comprises amplifying the audio data of the speaker of the one or more speakers, and wherein the machine learning comprises performing training using historical order transcripts corresponding to the one or more menu items in the menu;
      link metadata of the audio data to the one or more speakers based on one or more segments of the audio data;
      determine, from the processed audio data, at least one intention of the one or more menu items of the menu associated with at least one of a food item or a beverage item in the menu, wherein the at least one intention corresponds to a quantity of at least one of the food item or the beverage item; and
      communicate, in response to determining the at least one intention and the corresponding quantity, with the at least one POS terminal to execute the order processing of the eatery.

2. The system of claim 1, wherein the processor is configured to process the audio data in an online mode or an offline mode.

3. The system of claim 1, wherein the audio data is received from a static file, the Internet, or via Bluetooth.

4. The system of claim 1, wherein the processor is configured to generate the metadata comprising data relating to the at least one intention to place one or more orders, and to associate the metadata with the one or more speakers.

5. The system of claim 1, wherein the at least one POS terminal is disposed in the eatery and the processor is part of the cloud-based computing system remote from the eatery.

6. The system of claim 1, wherein the cloud-based computing system is configured to direct one or more orders to the at least one POS terminal.

7. The system of claim 1, wherein processing the audio data further comprises identifying at least one match between a list of menu items and the audio data and at least one non-match between the list of menu items and the audio data, and wherein the list of menu items comprises menu items specific to the eatery.

8. The system of claim 1, wherein the audio signal interface comprises a voice application programming interface (API) and a digital assistant configured to dialogue with the one or more speakers.

9. A method implementable via a cloud-based computing system, comprising:
- receiving, by a processor, audio data via an audio signal interface comprising audio of at least an order corresponding one or more menu items of a menu of an eatery;
- processing, by the processor, the audio data to identify one or more speakers from which the audio data is produced, wherein the audio data is processed using machine learning to assign an individual identity to a speaker of the one or more speakers, wherein the processing comprises amplifying the audio data of the speaker of the one or more speakers, and wherein the machine learning includes training using historical order transcripts corresponding to one or more menu items in the menu;
- linking, by the processor, metadata of the audio data to the one or more speakers based on one or more segments of the audio data;
- determining, by the processor, at least one intention of the one or more menu items of the menu based on the processed audio data associated with at least one of a food item or a beverage item in the menu, wherein the at least one intention corresponds to a quantity of at least one of the food item or the beverage item; and
- communicating, by the processor in response to determining the at least one intention and the corresponding quantity, with at least one point-of-sale (POS) terminal to execute order processing of the one or more menu items of the menu of the eatery, the at least one POS terminal being configured to communicate wirelessly with the cloud-based computing system.

10. The method of claim 9, further comprising processing, by the processor, the audio data in an online mode or an offline mode.

11. The method of claim 9, wherein the audio data is received from a static file, the Internet, or via Bluetooth.

12. The method of claim 9, further comprising generating, by the processor, the metadata comprising data relating to the at least one intention to place one or more orders, and to associate the metadata with the one or more speakers.

13. The method of claim 9, wherein the at least one POS terminal is disposed in the eatery and the at least one POS terminal is part of a cloud-based computing system remote from the eatery.

14. The method of claim 13, wherein the cloud-based computing system directs one or more orders to the at least one POS terminal.

* * * * *